(12) United States Patent
Takayama et al.

(10) Patent No.: US 6,891,150 B2
(45) Date of Patent: May 10, 2005

(54) OPTICAL SCALE FORMED FROM MOLD HAVING FIXED AND MOVABLE PLATENS

(75) Inventors: Manabu Takayama, Kanagawa (JP); Masahiko Igaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/832,116

(22) Filed: Apr. 11, 2001

(65) Prior Publication Data

US 2002/0000515 A1 Jan. 3, 2002

(30) Foreign Application Priority Data

Apr. 17, 2000 (JP) .......................................... 2000-115514
Apr. 3, 2001 (JP) .......................................... 2001-104997

(51) Int. Cl.[7] ................................................. G01D 5/34
(52) U.S. Cl. .............................. 250/231.13; 250/237 R; 356/616
(58) Field of Search ................................. 356/615–616; 250/231.1–231.18, 237 R

(56) References Cited

U.S. PATENT DOCUMENTS

| | | | | |
|---|---|---|---|---|
| 3,598,493 A | * | 8/1971 | Fisher | .................... 250/231.16 |
| 4,780,610 A | * | 10/1988 | Abe | .......................... 250/231.1 |
| 4,952,799 A | * | 8/1990 | Loewen | .................. 250/231.16 |
| 5,038,031 A | * | 8/1991 | Kurosawa et al. | ..... 250/231.14 |
| 5,086,221 A | * | 2/1992 | Ishihara et al. | ........ 250/231.13 |
| 5,359,193 A | | 10/1994 | Nyui et al. | .............. 250/237 G |
| 5,481,106 A | | 1/1996 | Nyui et al. | .............. 250/237 G |
| 5,483,059 A | | 1/1996 | Igaki et al. | ............ 250/231.16 |
| 5,922,266 A | * | 7/1999 | Grove | ...................... 264/297.2 |
| 6,055,111 A | * | 4/2000 | Nomura et al. | ............. 359/642 |
| 6,255,644 B1 | * | 7/2001 | Taniguchi et al. | ..... 250/231.13 |

FOREIGN PATENT DOCUMENTS

JP          63-33409          3/1988

* cited by examiner

Primary Examiner—Thanh X. Luu
Assistant Examiner—Stephen Yam
(74) Attorney, Agent, or Firm—Fitzpatrick, Cella, Harper & Scinto

(57) ABSTRACT

It is an object of this invention to provide a mold for manufacturing an optical scale which can be easily manufactured and is capable of outputting high-precision position signals. In order to achieve this object, there is provided a mold for an optical scale, which has fixed and movable platens and is used to mold an optical scale, wherein both a first mold portion for forming a shaft mount hole for the optical scale and a second mold portion for forming a slit portion of the optical scale are arranged in one of the fixed and movable platens.

5 Claims, 46 Drawing Sheets

FIG. 10
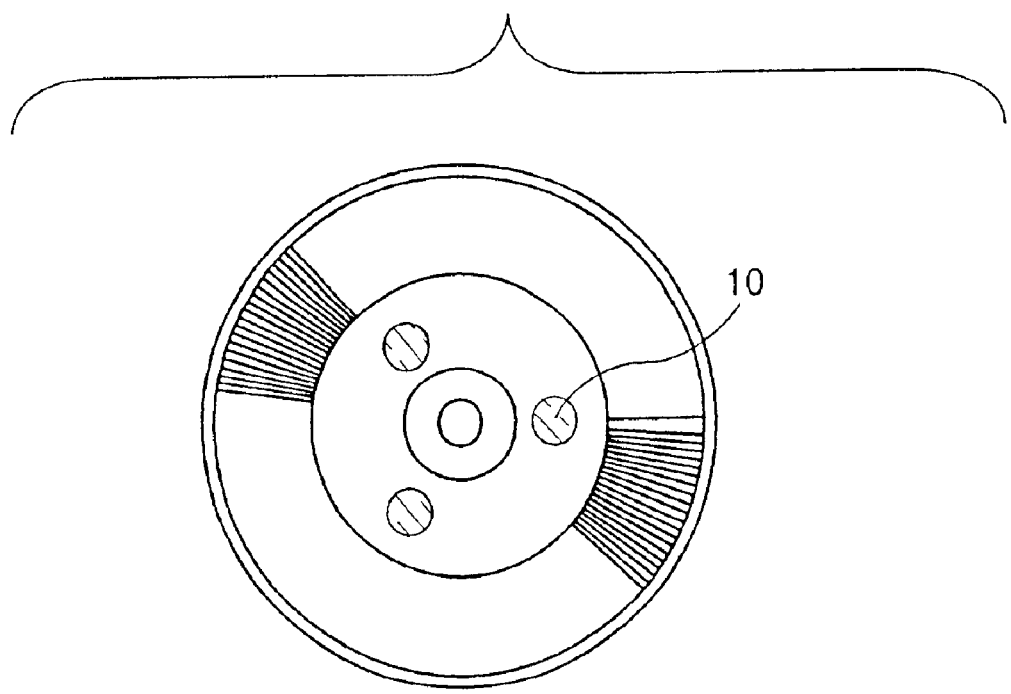
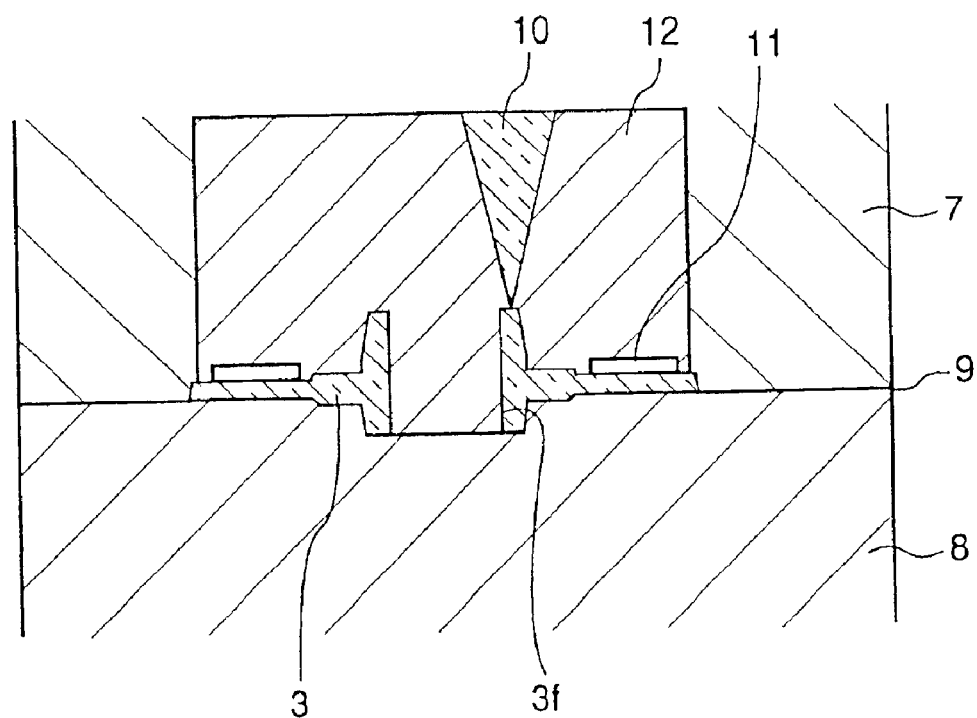

FIG. 11
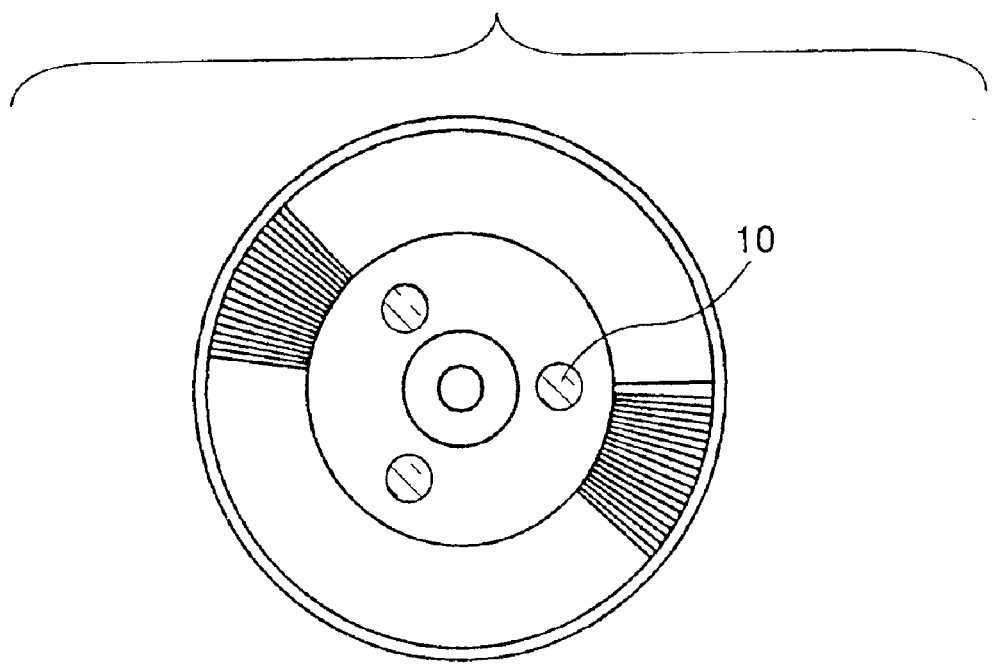
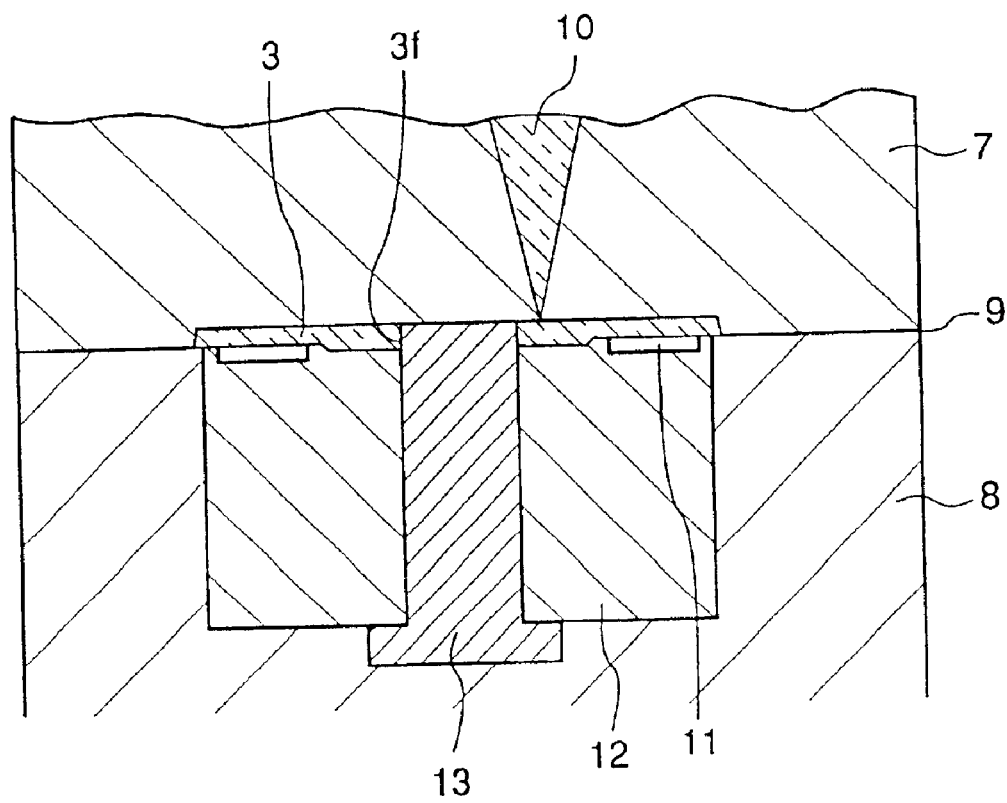

FIG. 12
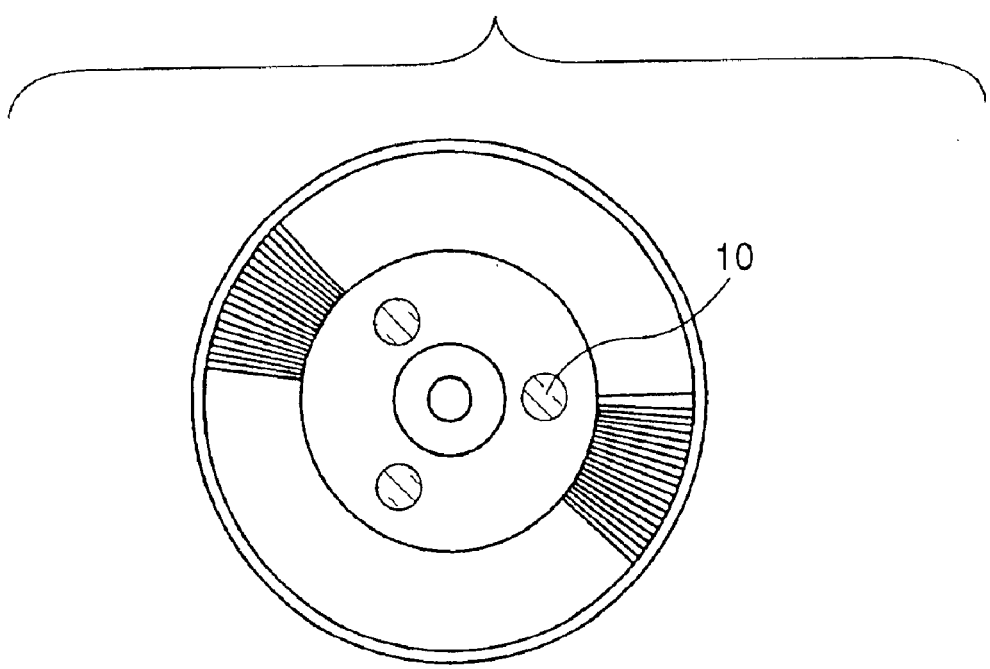
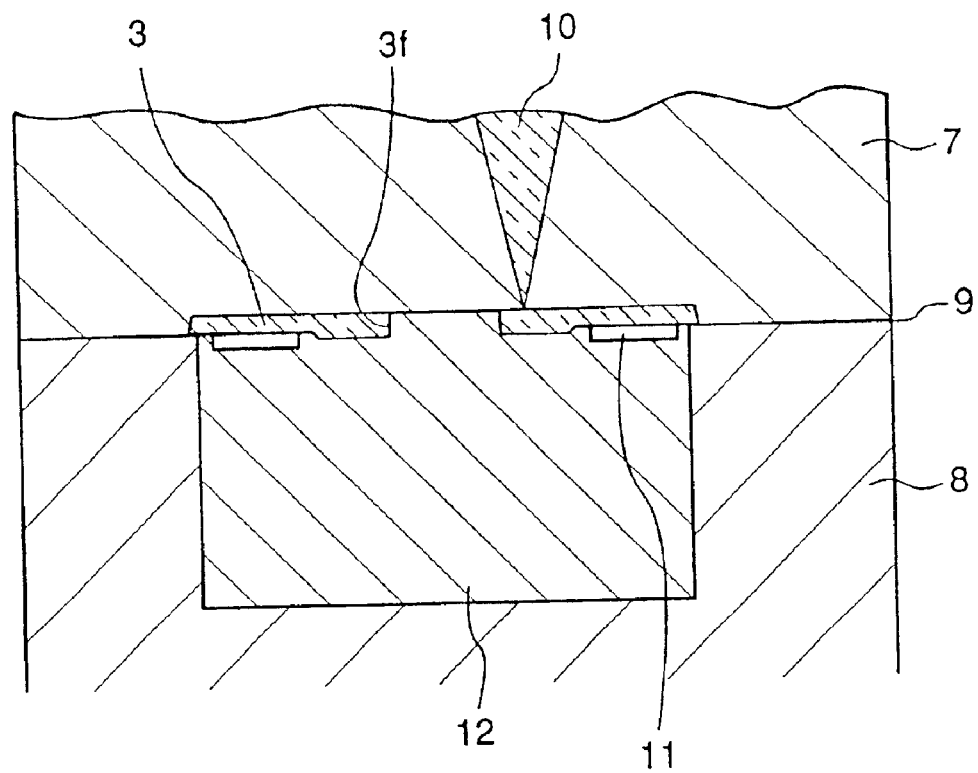

FIG. 13
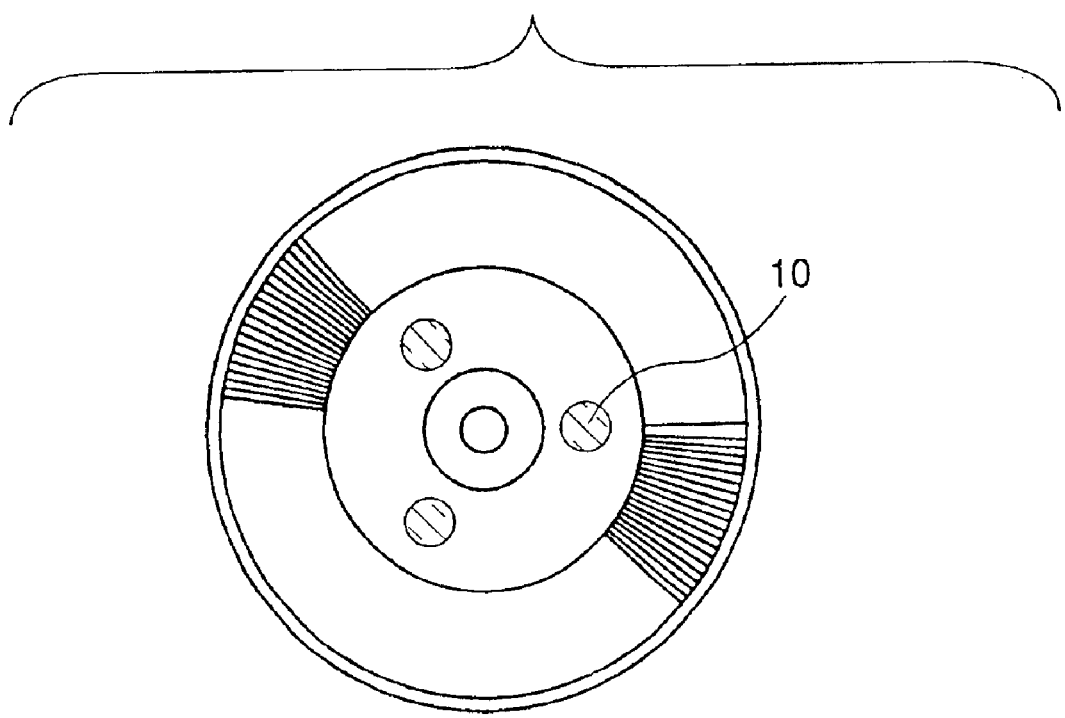
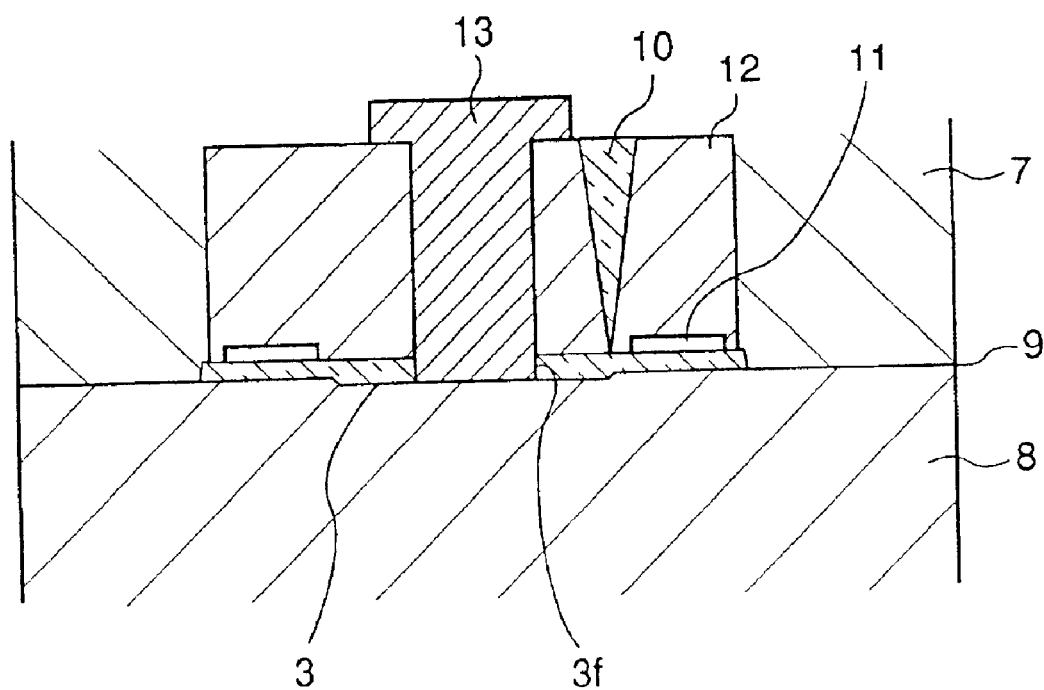

FIG. 14
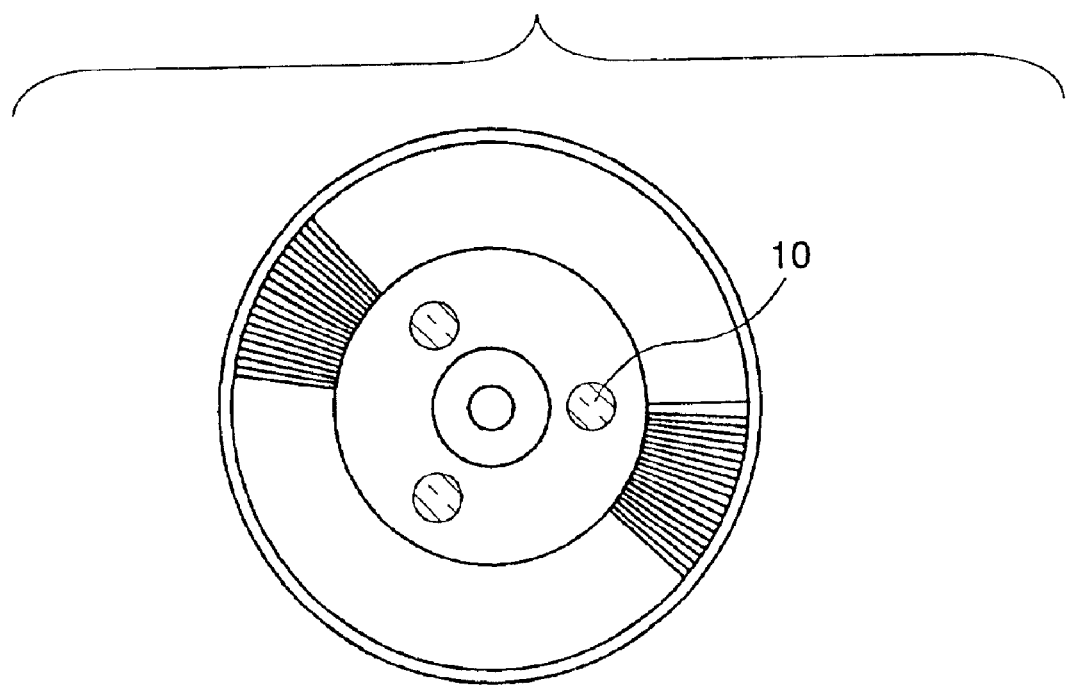
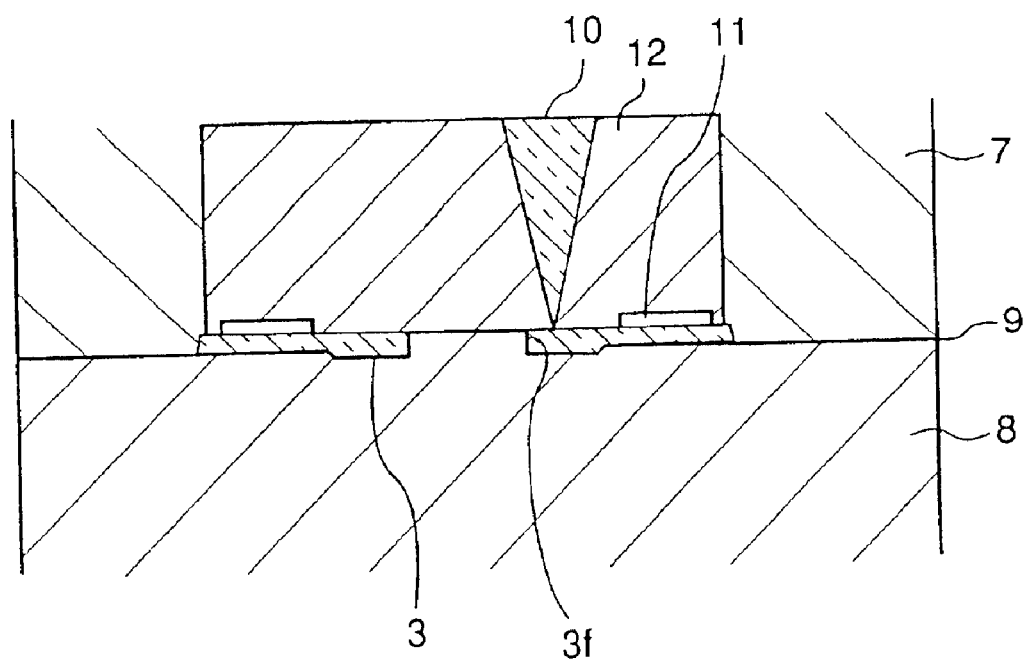

F I G. 38
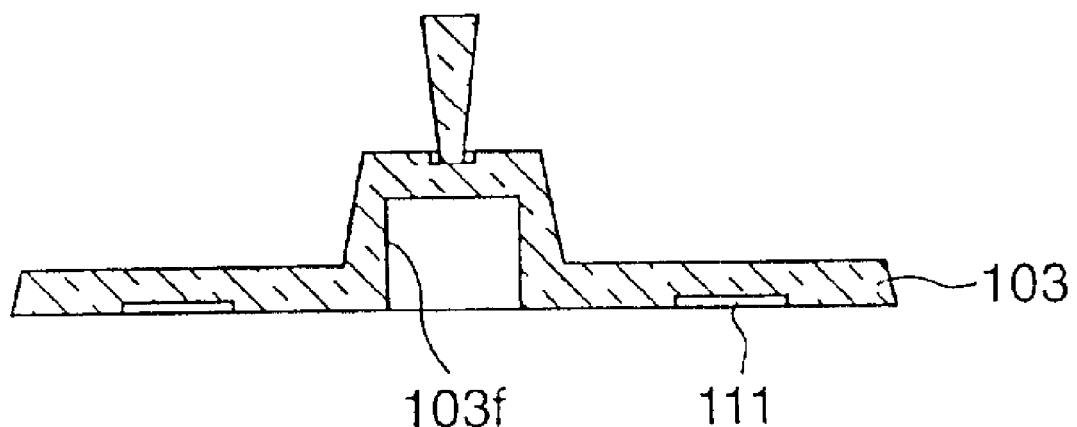

F I G. 40
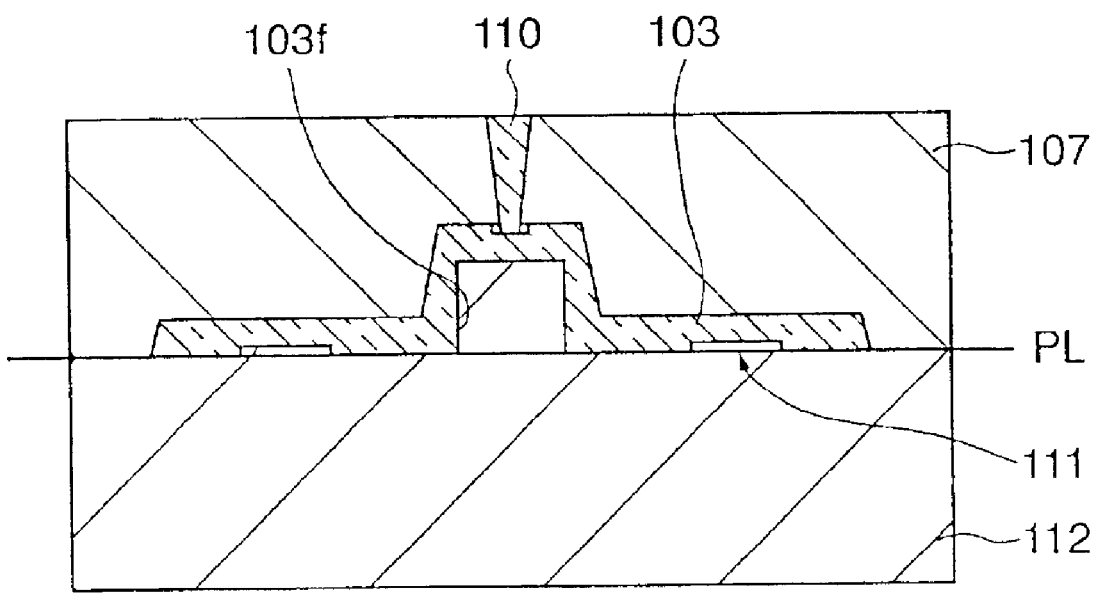

FIG. 41
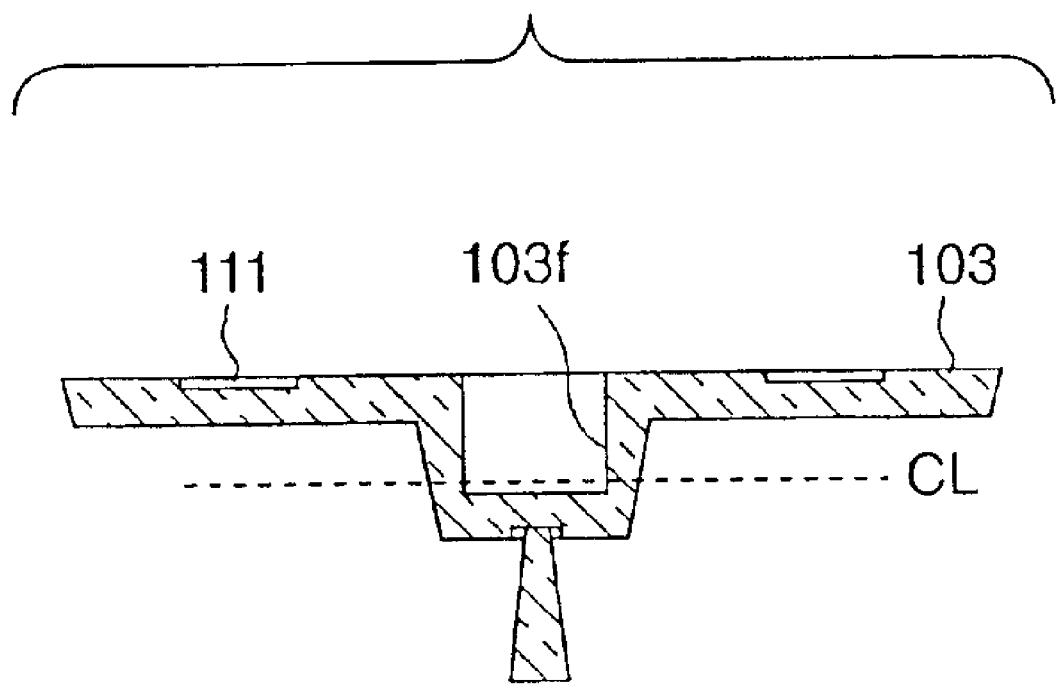
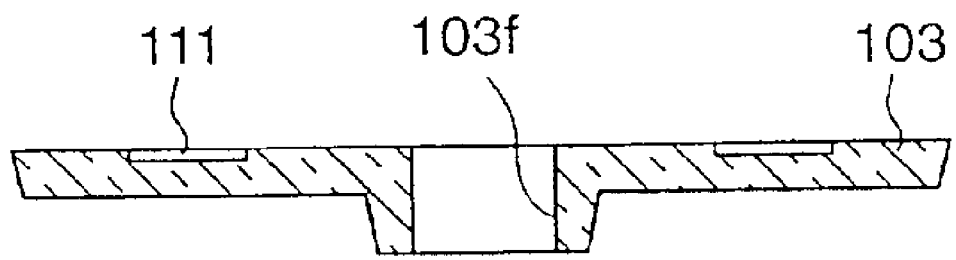

OPTICAL SCALE FORMED FROM MOLD HAVING FIXED AND MOVABLE PLATENS

FIELD OF THE INVENTION

The present invention relates to an optical encoder for accurately detecting movement information, an optical scale used for the encoder, and a mold for molding the scale.

BACKGROUND OF THE INVENTION

Conventional methods of detecting the position or speed of an moving object can be roughly classified into methods using magnetic encoders and methods using optical encoders. The optical encoder is mainly constituted by a light-emitting portion, light-receiving portion, and scale. The scale is generally manufactured by precision press-cutting or etching by using a thin SUS (stainless steel) plate. This scale corresponds to the one disclosed in Japanese Utility Model Laid-Open No. 63-33409.

According to the scale manufactured by the above conventional technique, a hub portion required to fix the scale to a motor shaft is formed as a discrete component. In order to guarantee coaxial mounting between the scale slit portion and hub portion, the scale and hub must be adjusted when they are attached, requiring much time and labor.

As a conventional scale for an optical rotary encoder, a metal scale obtained by forming a slit portion in a metal plate having a thickness of about 0.05 mm to 0.2 mm by etching or the like, or a film scale obtained by forming a light-transmitting portion and light-absorbing portion on a photoengraving film having a thickness of about 0.2 mm by using a means such as photographic development is known. As a high-precision scale used in a field demanding high precision, a glass scale obtained by depositing a thin metal film on a glass substrate and forming a slit portion by photoetching or the like is known.

Each scale described above indirectly coupled to the coupling portion of a rotating shaft through a hub member. It is difficult to fix the scale to the shaft while maintaining high eccentricity precision between the center of the slit portion formed in the scale and the rotating shaft. This requires high-precision adjustment. Likewise, owing to the above arrangement, it is difficult to keep high squareness precision between the scale and the rotating shaft in the presence of wobbling of the scale surface upon rotation. Furthermore, since a metal scale or film scale has a thickness of 0.2 mm or less, it exhibits poor flatness. As a consequence, the scale suffers from large wobbling (flapping) of the surface. This becomes a factor that causes a deterioration in angle detection precision. It is relatively easy for a glass scale, from which relatively high flatness can be obtained, to improve squareness precision. However, this scale is susceptible to shock, and expensive.

Attempts to avoid such factors that cause deterioration in precision have interfered with reductions in the size and cost of encoder units. For example, with regard to the size of an encoder in the direction of thickness (shaft thrust direction), to minimize wobbling of the surface, the scale mount hub needs to be long. This increases the overall size of the encoder unit in the thrust direction, interfering with a reduction in the profile of the encoder. In addition, in order to couple/assemble the above components while high coaxiality and squareness are maintained, a high-precision adjustment process is required, resulting in an increase in cost.

SUMMARY OF THE INVENTION

The present invention has therefore been made in consideration of the above problems, and has as its object to provide an optical scale which can be easily manufactured and is capable of outputting high-precision position signals, a mold for the scale, and an optical encoder.

In order to solve the above problems and achieve the above object, a mold for an optical scale according to the present invention is characterized by having the following arrangement.

There is provided a mold for an optical scale which has fixed and movable platens and is used to mold an optical scale, wherein both a first mold portion for forming a shaft mount hole for the optical scale and a second mold portion for forming a slit portion of the optical scale are arranged in one of the fixed and movable platens.

An optical scale of the present invention, according to its first aspect, is characterized by being manufactured by the above mold.

An optical encoder according to the present invention, according to its first aspect, is characterized by having the following arrangement.

The optical encoder comprises light radiation means and light-receiving means opposing the light radiation means, and the above optical scale is disposed between the light radiation means and the light-receiving means.

An optical encoder of the present invention, according to its second aspect, is characterized by having the following arrangement.

In the optical encoder in which a light beam from light radiation means is incident on an optical scale, the light beam is reflected by a mirror or optical element to be returned to the optical scale, and the light beam is received by light-receiving means through a grating portion of the optical scale, thereby optically detecting a position or speed of a moving object, the above optical scale is used as the optical scale.

An optical scale of the present invention, according to its second aspect, is characterized by having the following arrangement.

The optical scale has a reflecting portion for reflecting light emitted from a light-emitting portion of a sensor having the light-emitting portion and a light-receiving portion and returning the light to the light-receiving portion. A shaft holding portion of the optical scale which holds a shaft for rotating the optical scale and the reflecting portion are integrally molded by using a resin. The shaft holding portion and the reflecting portion are formed on a single surface of the optical scale.

An optical encoder of the present invention, according to its third aspect, is characterized by having the following arrangement.

This encoder is an optical encoder using the above optical scale, and the sensor is disposed on the same holding member as that for a bearing for rotatably supporting the optical scale.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 10 is a sectional view of a mold according to the fourth embodiment of the present invention;

FIG. 11 is a sectional view of a mold according to the fifth embodiment of the present invention;

FIG. 12 is a sectional view of a mold according to the sixth embodiment of the present invention;

FIG. 13 is a sectional view of a mold according to the seventh embodiment of the present invention;

FIG. 14 is a sectional view of a mold according to the eighth embodiment of the present invention;

FIG. 38 is a sectional view of a rotary encoder scale as a product according to the 14th embodiment;

FIG. 40 is a sectional view of another example of the mold for the scale according to the 14th embodiment;

FIG. 41 is a sectional view of another example of the rotary encoder scale as the product according to the 14th embodiment;

DETAILED DESCRIPTION OF THE PREFERRED EMBODIMENTS

Preferred embodiments of the present invention will now be described in detail in accordance with the accompanying drawings.

First Embodiment

Figure 1:
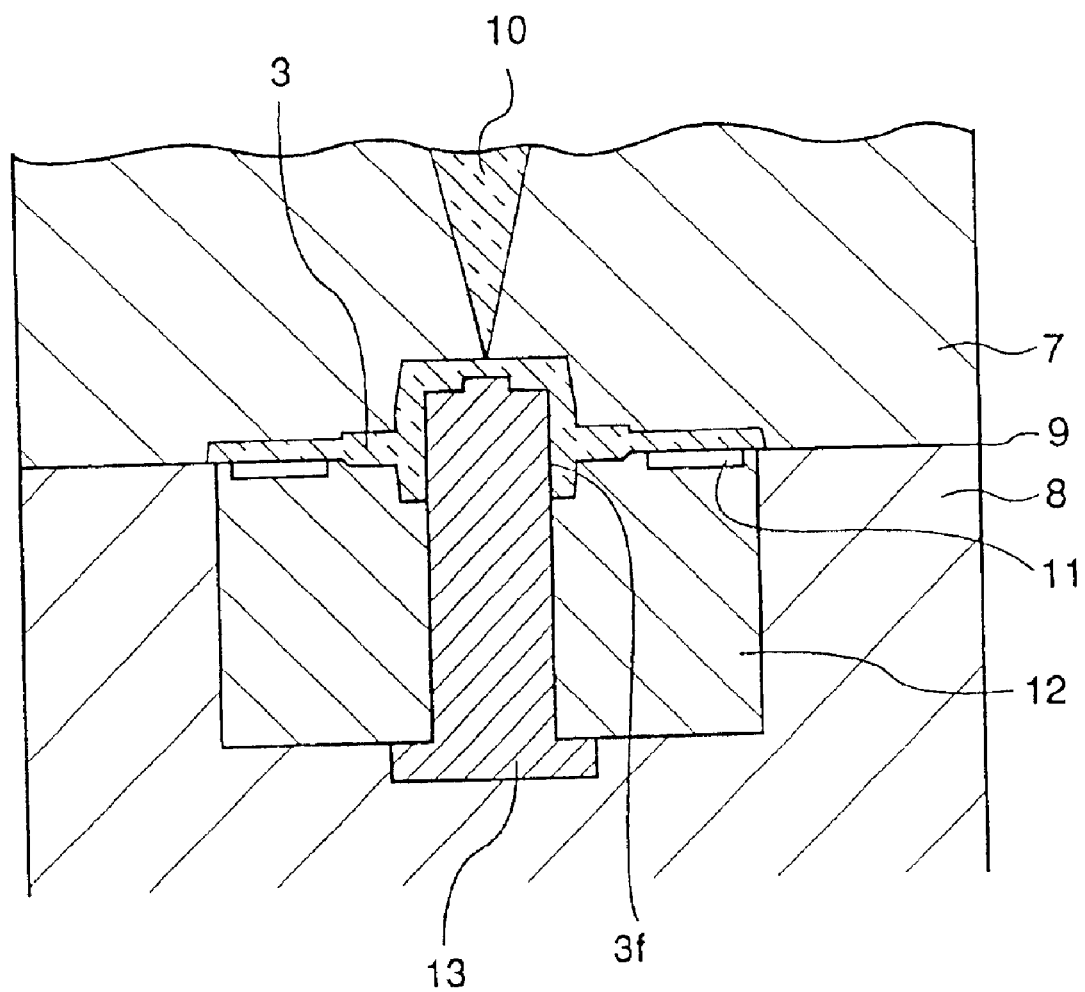
FIG. 1 is a sectional view of a mold for manufacturing an optical scale according to the first embodiment of the present invention.
Figure 2:
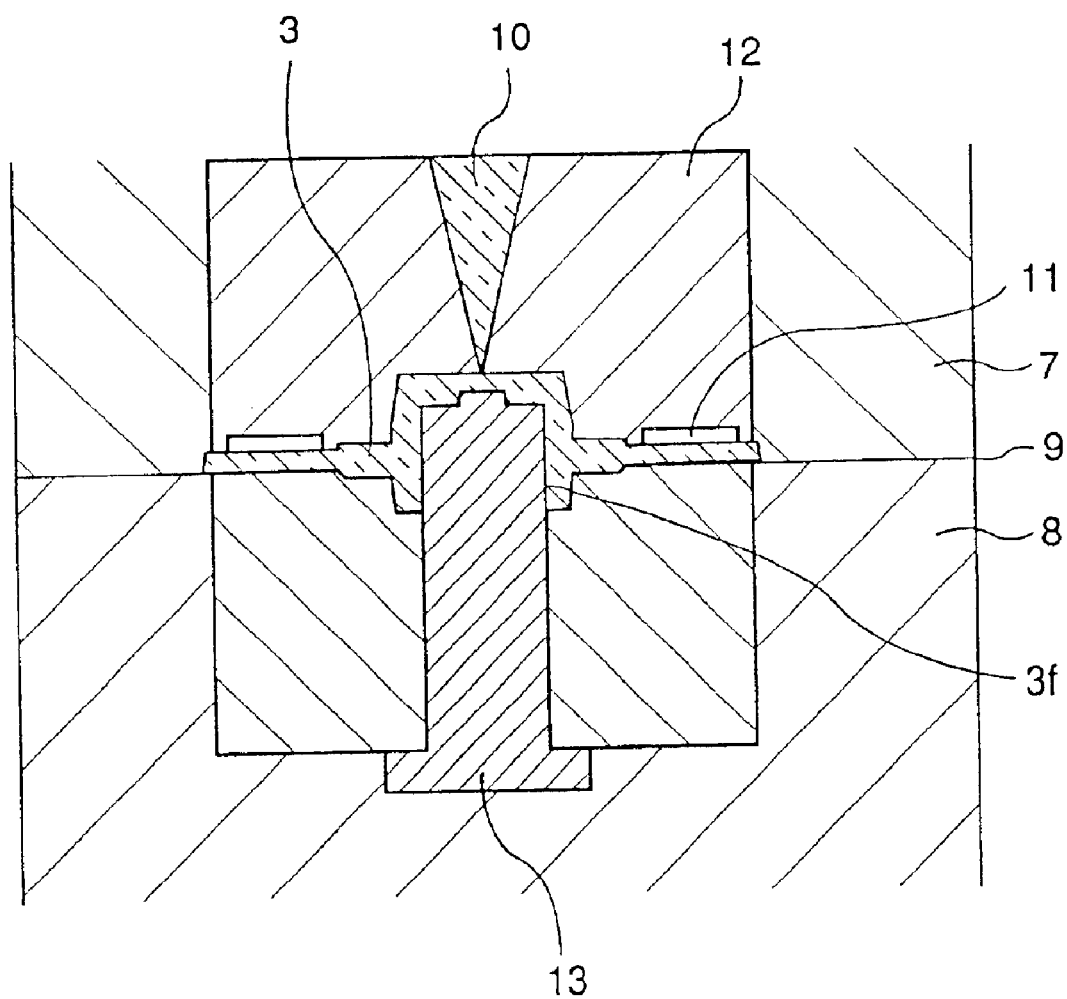
FIG. 2 is a sectional view of a conventional mold structure.

FIG. 1 is a sectional view of a mold for manufacturing an optical scale according to the first embodiment of the present invention. FIG. 2 is a view showing a conventional mold.

As shown in FIG. 2, when a mold portion 12 for forming a slit portion 11 of an optical scale 3 and a mold portion 13 for forming a shaft mount hole 3f are respectively arranged in a movable platen 7 and fixed platen 8, the positional relationship between the slit portion 11 and shaft mount hole 3f varies depending on how the movable platen 7 and fixed platen 8 are fitted to each other. For this reason, when an optical scale manufactured by the mold arrangement shown in FIG. 2 is used for an optical encoder, the accumulative error of output signals from the encoder exhibits large variations, resulting in difficulty in high-precision speed control and positioning control.

In contrast to this, when a mold portion 12 for forming a slit portion 11 and a mold portion 13 for forming a shaft mount hole 3f are arranged in only a fixed platen 8, as shown in FIG. 1, since the positional relationship between the two mold portions depends on fitting precision in a machining process, stable coaxiality can be ensured. This makes it possible to reduce accumulative error variations in output signals from the optical scale. In addition, output signals with higher precision can be detected by calculating the eccentricity of the slit portion 11 and shaft mount hole 3f from the accumulative error and correcting the eccentricity on the basis of the calculation result. Referring to FIG. 1, reference numeral 10 denotes a gate for injecting a resin material into the mold; and 9, a partition line that separates the movable platen 7 from the fixed platen 8.

Accumulative error in output signals in a case where an optical scale manufactured by the mold structure shown in FIG. 1 is used for an optical rotary encoder will be described next.

Figure 3:
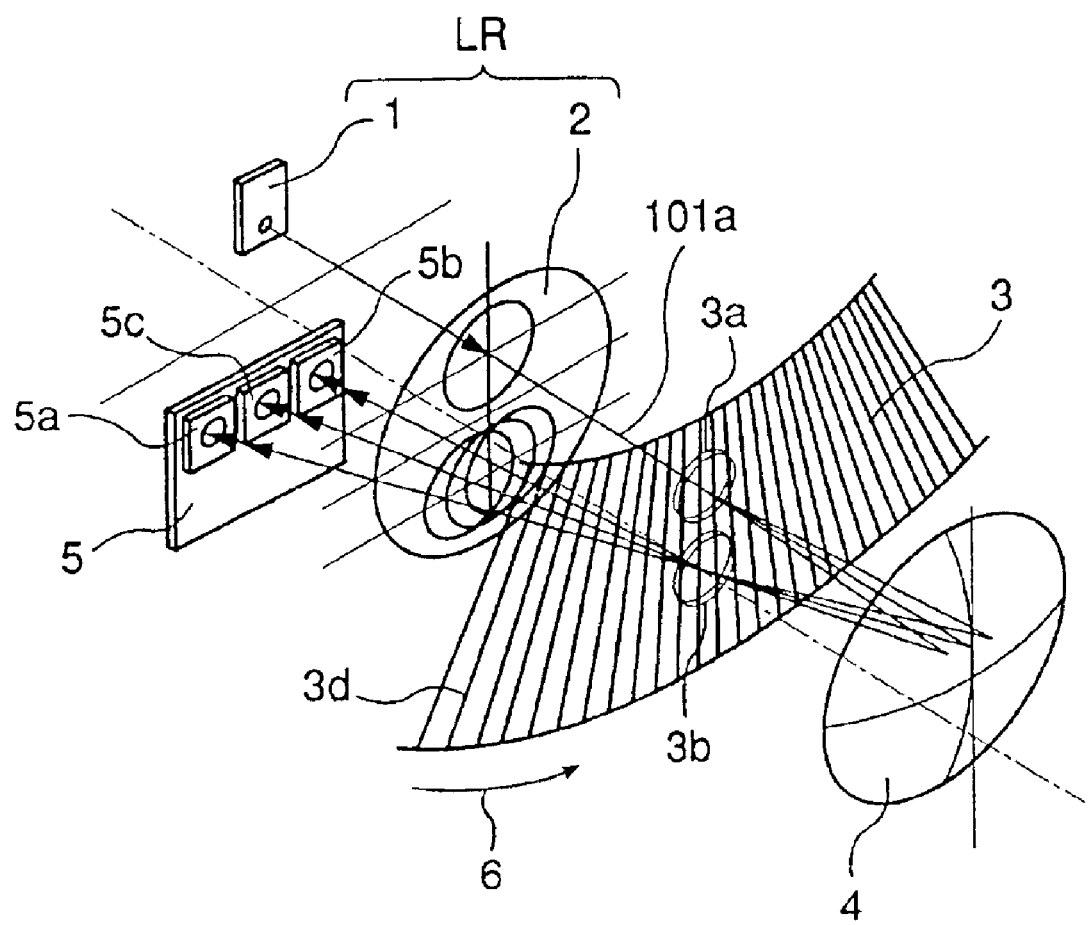
FIG. 3 is a perspective view of the main part of the optical system of a rotary encoder.
Figure 4:
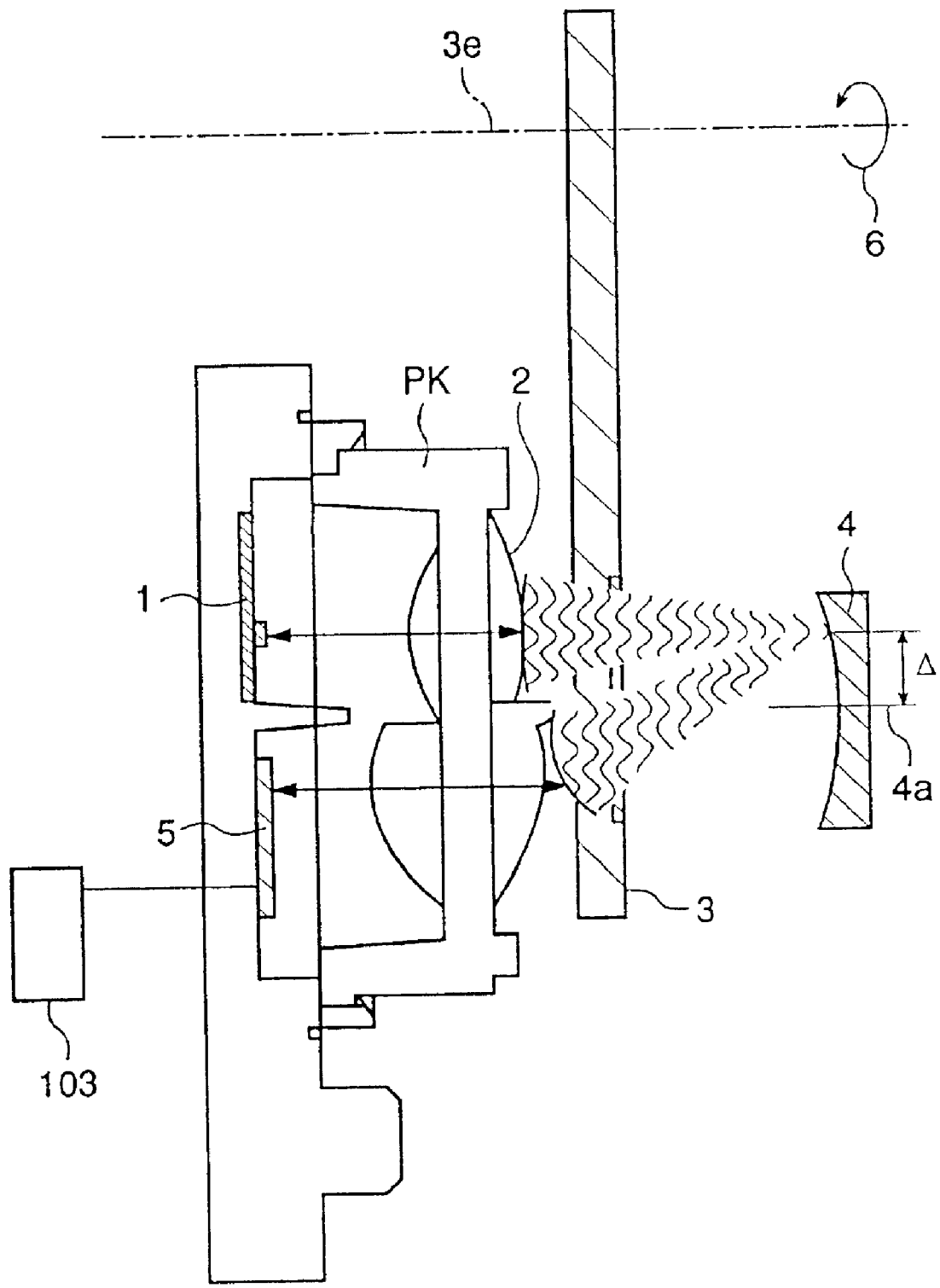
FIG. 4 is a sectional view of the main part of the optical system of the rotary encoder.
Figure 5A:
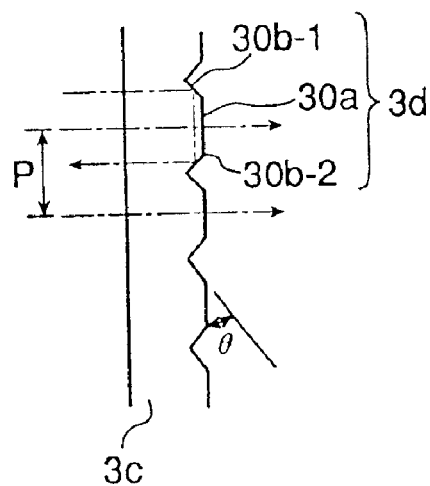
FIGS. 5A to 5C are views for explaining an optical scale and signals from the grating portion and light-receiving portion of the optical scale.
Figure 5B:
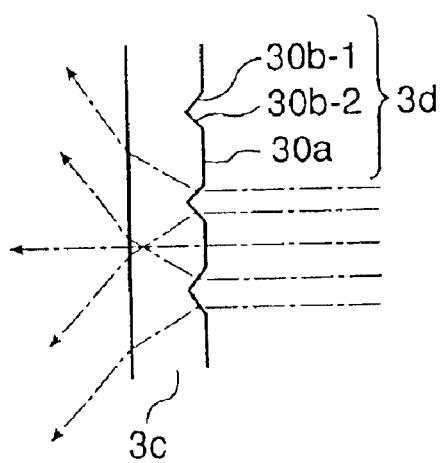
Figure 5C:
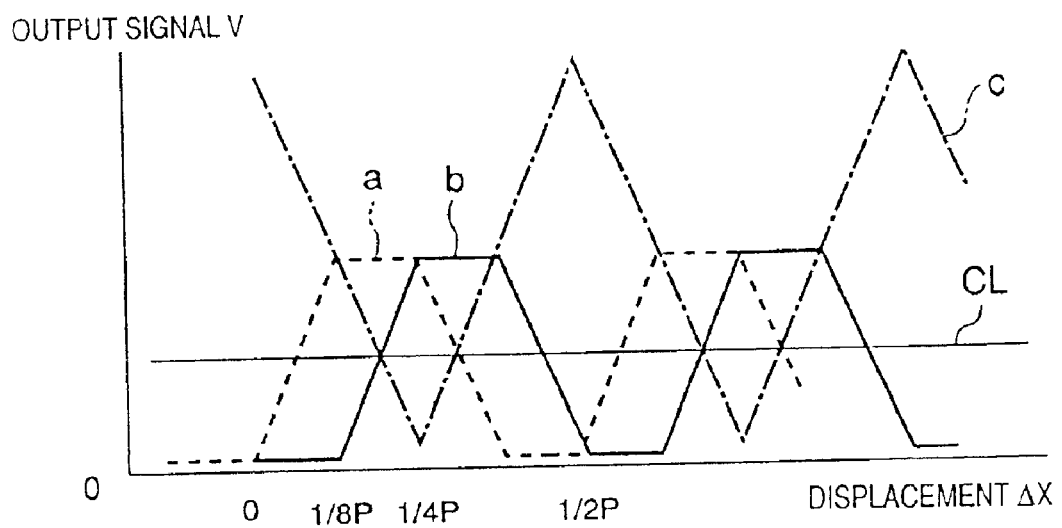
Figure 6:
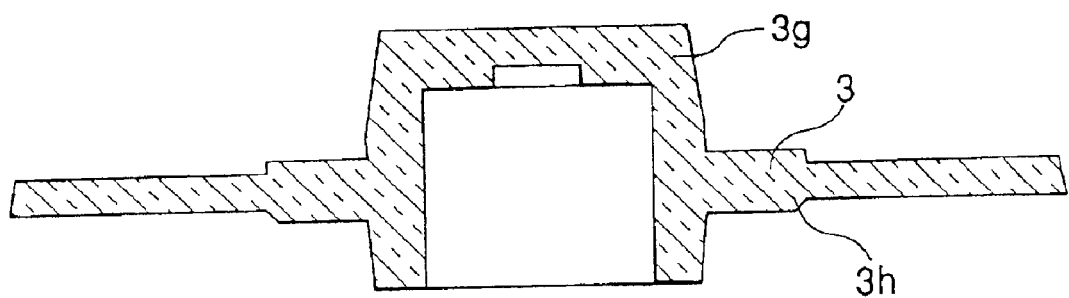
FIG. 6 is a sectional view of the optical scale.

FIG. 3 is a perspective view of the main part of an optical system. FIG. 4 is a sectional view showing the main part of the optical system. FIGS. 5A to 5C are views for explaining the optical scale and signals from the grating portion and light-receiving portion of the optical scale. FIG. 6 is a sectional view of the main part of the optical scale.

Referring to FIG. 3, reference numeral 1 denotes a light source, which is formed by, for example, an LED or semiconductor laser and emits a coherent light beam having a wavelength λ (632.8 nm); and 2, a lens system which is formed by a spherical or aspherical lens and focuses a light beam from the light source 1 to guide it to the optical scale 3 (to be described later).

The light source 1 and lens system 2 constitute one element of a light radiation portion LR. The optical scale 3 has a phase difference detection function and amplitude type diffraction grating function. As shown in FIG. 3, a grating portion 3d constituted by a plurality of radial grating elements with a predetermined period is formed on the surface of a disk-like substrate. The substrate of the optical scale 3 is made of a transmission optical material (resin material), mounted on part of a rotating member (not shown), and rotates about a rotation axis 3e in the direction indicated by an arrow 6, together with the rotating member.

FIGS. 5A and 5B are views showing the details of the grating portion 3d of the optical scale 3. The grating portion 3d is formed by alternately forming two inclined surfaces 30b-1 and 30b-2 forming a V-groove portion and one flat portion 30a at a predetermined pitch. The width of each V-groove is (½)P. Each of the two inclined surfaces 30b-1 and 30b-2 forming the V-groove has a width of (¼)P. Each of the inclined surfaces 30b-1 and 30b-2 is inclined at a critical angle or more, θ=45° in this embodiment.

In this embodiment, the optical scale 3 is made of polycarbonate and formed by injection molding, compression molding, or the like. In this case, a mold for forming the optical scale is the mold constituted by the fixed platen 8 and movable platen 7 as shown in FIG. 1. Both the mold portions, i.e., the mold portion 13 for forming the shaft mount hole 3f of the optical scale 3 and the mold portion 12 for forming the slit portion 11, are arranged in either the movable platen 7 or the fixed platen 8, and the positional relationship between the two mold portions is maintained with high precision.

FIG. 6 is a sectional view of the optical scale 3. In this optical scale 3, a boss 3g and flange 3h, which are mounted on the shaft of a motor, are integrally formed. A resin is injected from the axial center of the boss 3g through the pin gate 10 as shown in FIG. 1 to make the resin radially flow from the axial center so as to make orientation and internal distortion in the material uniform, thereby obtaining a high-precision optical scale. Since signals with high S/N ratios cannot be obtained unless the V-grooves of the optical scale 3 are faithfully reproduced by molding, the resin is made to flow parallel to the groove direction of each V-groove. Reference numeral 4 denotes a concave mirror, which is formed by, for example, a spherical, elliptic, parabolic, or aspherical mirror. The concave mirror 4 coincides with the Fourier transform plane of the grating portion 3d.

In this embodiment, as shown in FIGS. 3 and 4, the respective elements are set such that when the light beam focused by the lens system 2 and incident on a first area 3a of the optical scale 3 is diffracted by the grating portion of the optical scale 3, the nth-order diffracted light (0th- and ±1st-order diffracted light) is focused on the surface of the concave mirror 4 or its neighboring portion (at the pupil position of the concave mirror 4 or its neighboring portion).

The optical axis of the concave mirror 4 and central ray (principal ray) of incident light beam are offset from each other by an eccentricity amount Δ, as shown in FIG. 4. The concave mirror 4 reflects convergent light beams (three diffracted light beams) diffracted and focused by the optical scale 3 to re-form an interference pattern image (image) based on the three diffracted light beams on a second area 3b on the surface of the optical scale 3. In this case, when the optical scale 3 moves in a rotating direction 6, the re-formed image moves in the opposite direction to the rotating direction 6. That is, the grating portion and interference pattern image are relatively displaced by a value twice the moving amount of the optical scale 3. In this embodiment, with this operation, rotation information has a resolution twice that of the grating portion is formed on the optical scale 3.

Reference numeral 5 denotes a light-receiving portion having three photodetectors (light-receiving elements) 5a, 5b, and 5c for receiving three light beams, which are based on the phase relationship between an interference pattern formed near the second area 3b of the grating portion 3d of the optical scale 3 and the V-groove of the grating portion, upon geometrically refracting the three light beams by the second area 3b. A signal from the light-receiving portion 5 is processed by a signal processing circuit having a pulse count circuit and rotating direction discrimination circuit, thus obtaining rotation information. Note that the light source 1, lens system 2, and light-receiving portion 5 are fixed/held in a housing PK.

A method of detecting the rotation information of the optical scale (rotating member) 3 in this embodiment will be described next.

The lens system 2 focuses a light beam from the LED 1 as one element of the light radiation portion onto the reflecting surface of the concave mirror 4 or its neighboring portion. As shown in FIG. 3, this convergent light is incident on the first area 3a on the grating portion 3d of the optical scale 3. Of the convergent light incident on the first area 3a, a ray that has reached the flat portion 30a of the grating portion 3d in FIG. 5 passes through the flat portion 30a and propagates to the concave mirror 4 to be formed into an image on the surface of the concave mirror 4. Since the inclined surface 30b-1 forming the V-groove is inclined at the critical angle or more, the ray that has reached the inclined surface 30b-1 is totally reflected toward the other inclined surface 30b-2 forming the V-groove and totally reflected by the inclined surface 30b-2 as well.

As described above, the ray that has finally reached the inclined surface 30b-1 of the grating portion 3d is returned in the incident direction without entering the optical scale 3. Likewise, the ray that has reached the other inclined surface 30b-2 forming the V-groove is repeatedly returned by total reflection. Therefore, the light beams reaching the range of two inclined surfaces 30b-1 and 30b-2 forming the V-groove in the first area 3a are reflected without propagating through the optical scale 3, and only the ray that has reached the flat portion 30a propagates in the optical scale 3.

In the first area 3a, the V-groove grating portion 3d has the same optical effect as that of a transmission-type amplitude diffraction gating. A light beam is diffracted by the grating portion 3d in the first area 3a, and diffracted light such as 0th-, ±1st-, or ±2-order light is produced by the effect of the diffraction grating portion. The diffracted light is then focused on the surface of the concave mirror 4. The focused diffracted light is reflected by the concave mirror 4 which is offset from a principal ray 101a, and is re-formed into an image in the second area 3b of the optical scale 3, thereby re-forming an image (radial groove image) on the surface of the optical scale 3.

In this case, the first and second areas 3a and 3b differ in their positions (may partly overlap each other) in the radial direction of the radial grating portion 3d of the optical scale 3. In this case, since the optical scale 3 has the radial grating portion 3d, the pitch of the first area 3a differs from that of the second area 3b. In addition, in the irradiation area of the second area 3b, the pitch at the inner circumferential side differs from that at the outer circumferential side of the optical scale 3.

In this embodiment, therefore, the grating portion in the first area 3a is enlarged/projected on the second area 3b on the grating portion 3d to form an image (inverted image) with the same pitch as that of the radial grating portion 3d of the optical scale 3. For this reason, in this embodiment, the concave mirror 4 is set to have a desired radius of curvature R and eccentrically disposed with respect to the principal ray of an incident light beam, and the eccentricity amount A with respect to the incident optical axis is set to an appropriate value.

With this arrangement, when an image of the grating portion in the first area 3a is re-formed on the second area 3b by the concave mirror 4, the pitch of part of the radial grating coincides with that of the image, thereby obtaining a detection signal with a high S/N ratio.

In this embodiment, of the three light beams which are reflected by the concave mirror 4 and re-formed into images on the second area 3b of the grating portion 3d, only the light beam which is geometrically refracted by the grating portion 3d is used.

The light beam incident on the flat portion 30a in the second area 3b linearly propagates and reaches the photodetector 5c in the middle portion of the light-receiving portion 5, as shown in FIG. 5B. The light beams that have reached the two inclined surfaces 30b-1 and 30b-2 forming the V-groove are incident on the respective surfaces at an incident angle of 45°, and hence are greatly refracted in different directions to reach the photodetectors 5a and 5b on the two sides of the light-receiving portion 5.

As described above, in the second area 3b, the light beams are made to propagate in three different directions by a total of three types of surfaces inclined in different directions, i.e., the two inclined surfaces 30b-1 and 30b-2 inclined in different directions with respect to incident light beams and the flat portion 30a between V-grooves, and reach the photodetectors 5a, 5b, and 5c arranged at positions corresponding to the respective surfaces. That is, the V-groove grating portion 3d in the second area 3b functions as a light wavefront splitting element.

That is, light beams based on the phase relationship between the grating portion in the second area 3b and an interference pattern image formed on the surface of the grating portion are deflected in three directions and strike the respective photodetectors 5a, 5b, and 5c.

In this case, as the optical scale 3 rotates, the amounts of light detected by the photodetectors 5a, 5b, and 5c change. The balance between the amounts of light incident on the respective photodetectors changes in accordance with the relative displacements of the position of the grating portion 3d and image. As a consequence, if the optical scale 3 is rotated counterclockwise, a change in light amount accompanying the rotation of the optical scale 3, like that shown in FIG. 5C, is obtained. Referring to FIG. 5C, the abscissa represents the rotation amount of the optical scale 3, and the ordinate, the amount of light received.

Signals a, b, and c respectively correspond to photodetectors 5a, 5b, and 5c. Note that when the optical scale 3 rotates clockwise, the signals a, b, and c are respectively output from the photodetectors 5b, 5a, and 5c. On the basis of these signals, rotation information such as the rotational angle, rotation amount, rotational speed, or roll acceleration of the optical scale 3 is obtained.

FIG. 5C shows how the amount of light changes theoretically when the contrast of an image formed in the second area 3b is very high and almost ideal.

Figure 7:
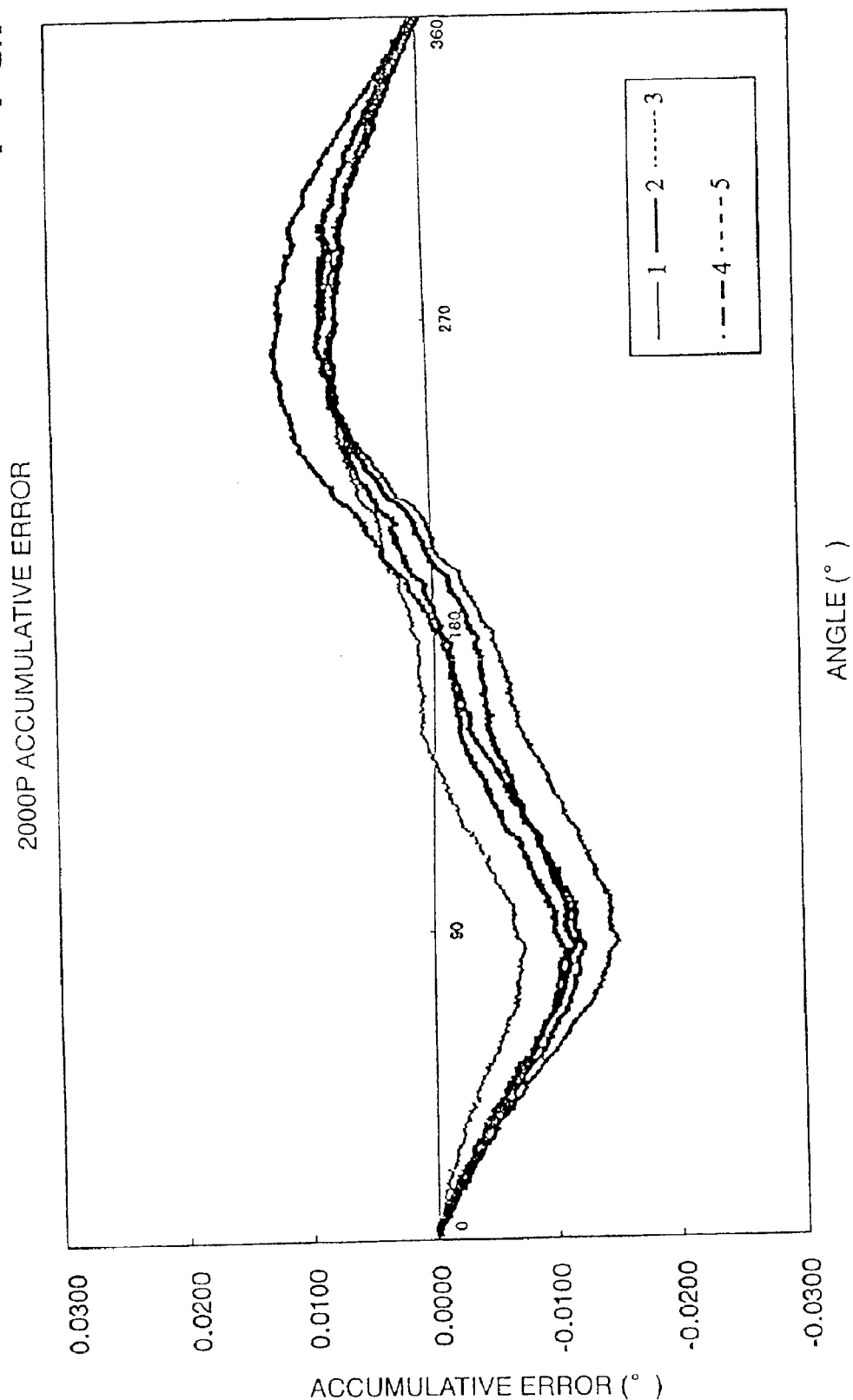
FIG. 7 is a graph showing accumulative error in rotary encoders.

FIG. 7 shows an accumulative error in this optical system. Referring to FIG. 7, the abscissa represents the rotation amount of the optical scale 3; and the ordinate, the accumulative value of scale pitch read errors. According to the accumulative error in FIG. 7, as is obvious, when five optical scales in this embodiment are measured, the differences in accumulative error between the scales are very small, and the positional relationship between the slit portion and the shaft mount hole is maintained in the molding process. In addition, since the resin flows uniformly into the optical scale 3 and V-grooves are transferred well, almost no high-order components exist except for 1st-order eccentricity component with respect to one revolution of the optical scale.

Second Embodiment

Figure 8:
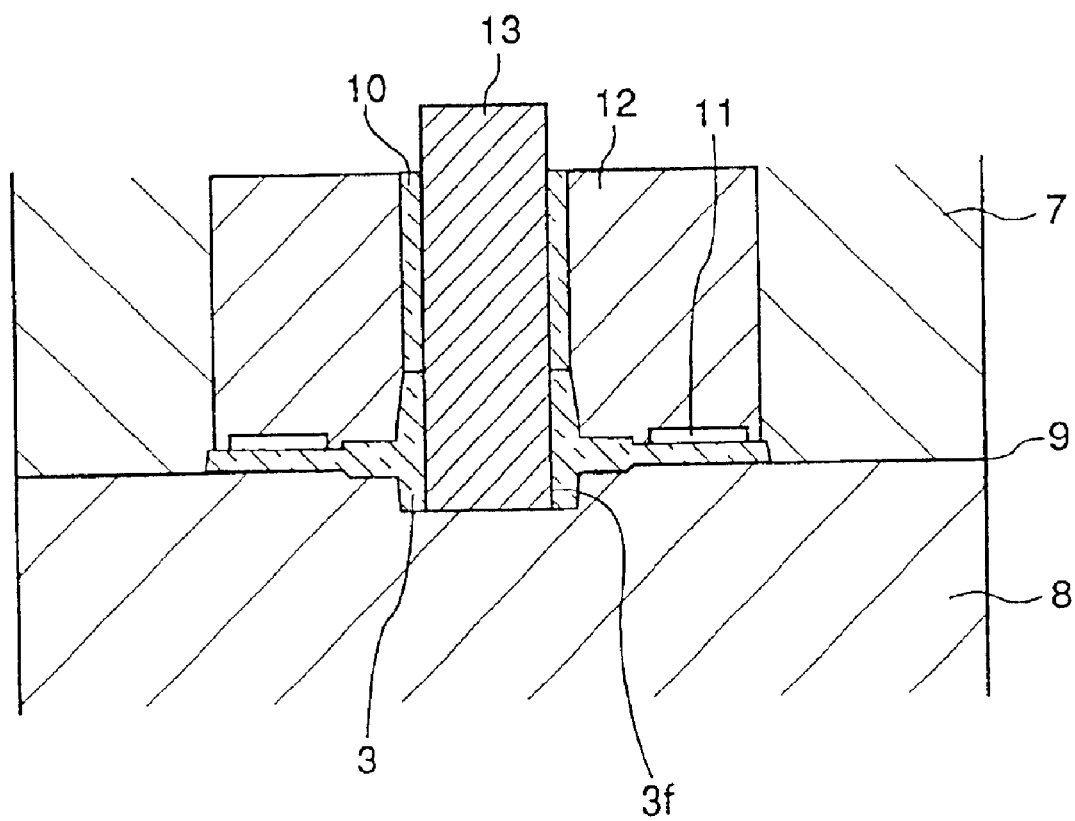
FIG. 8 is a sectional view of a mold according to the second embodiment of the present invention.

The second embodiment will be described next. FIG. 8 is a view showing a mold arrangement according to the second embodiment.

As shown in FIG. 8, since both mold portions, i.e., a mold portion 12 for forming a slit portion 11 and a mold portion 13 for forming a shaft mount hole 3f, are arranged in only a movable platen 7, the positional relationship between the two mold portions depends on the fitting precision in a machining process. Therefore, stable coaxiality is ensured. In this case, a gate 10 has an annular shape. The effect of this embodiment is the same as that of the first embodiment.

Third Embodiment

Figure 9:
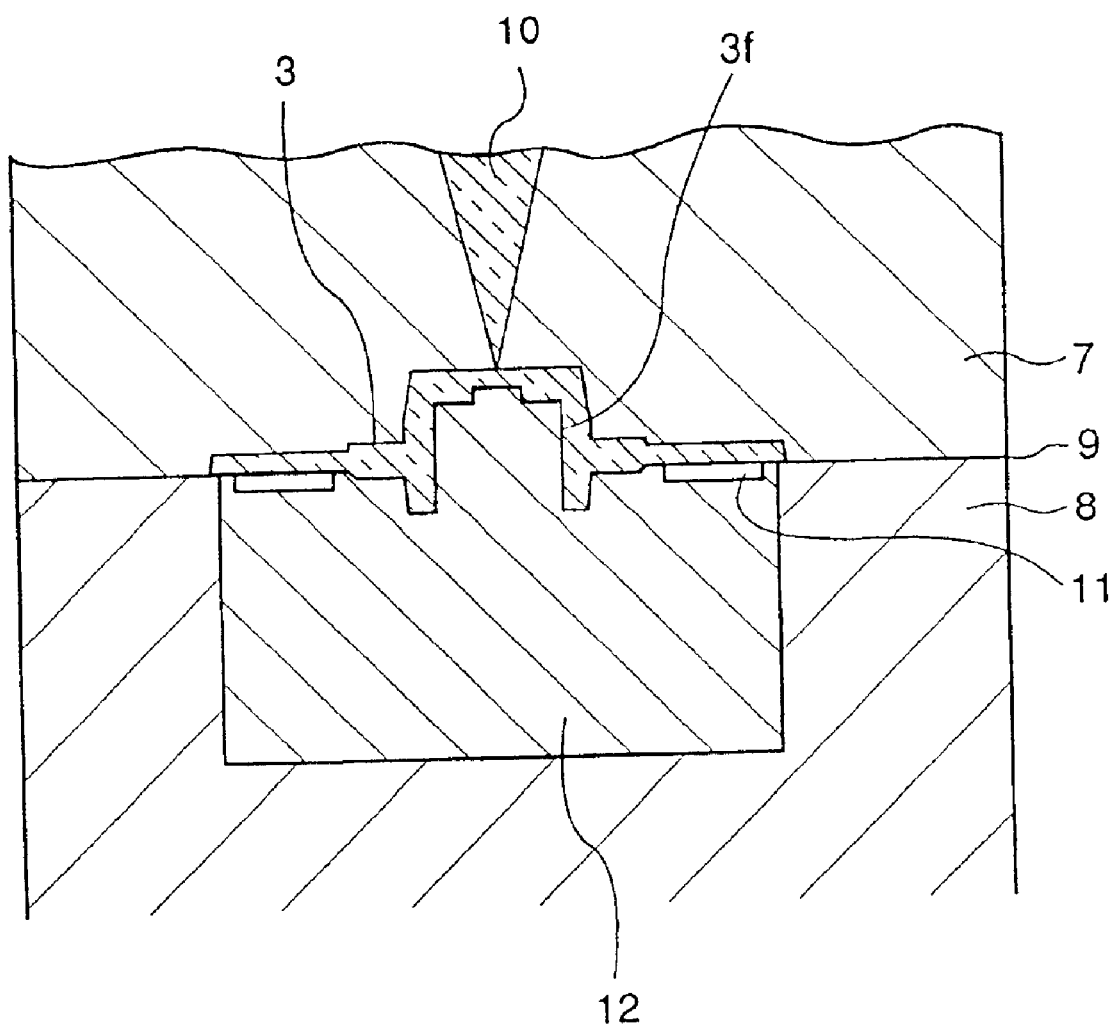
FIG. 9 is a sectional view of a mold according to the third embodiment of the present invention.
Figure 15A:
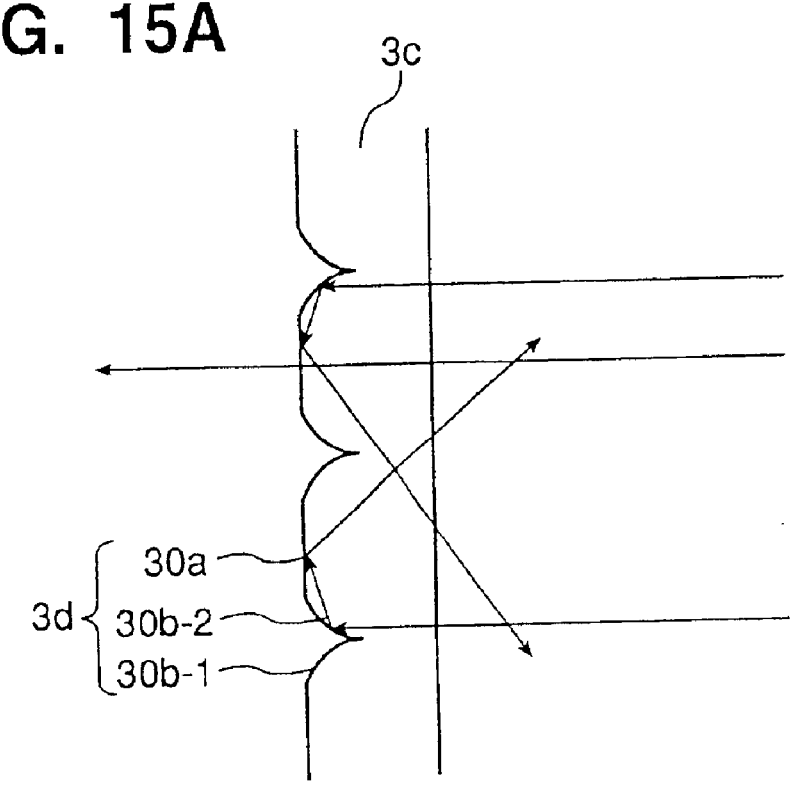
FIGS. 15A and 15B are sectional views of a scale according to the ninth embodiment of the present invention.
Figure 15B:
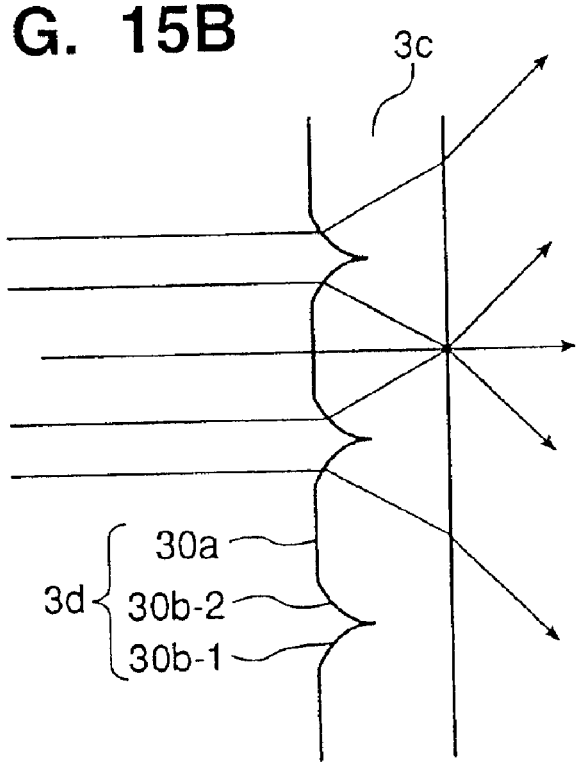
Figure 16A:
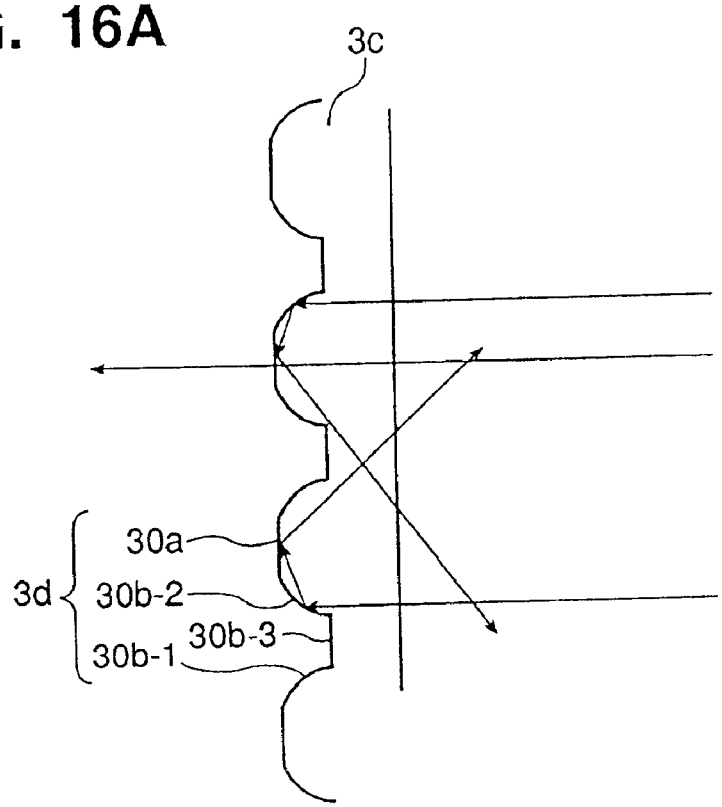
FIGS. 16A and 16B are sectional views of a scale according to the 10th embodiment of the present invention.
Figure 16B:
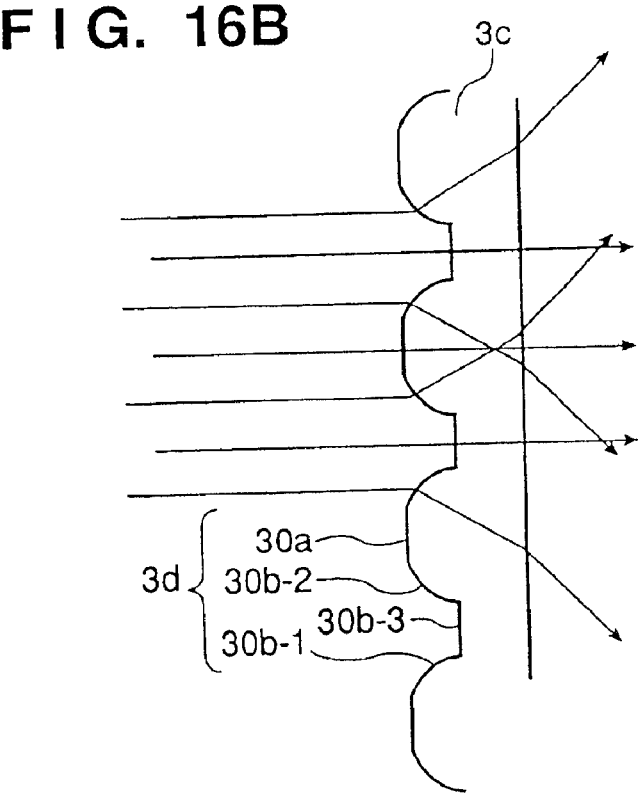
Figure 17A:
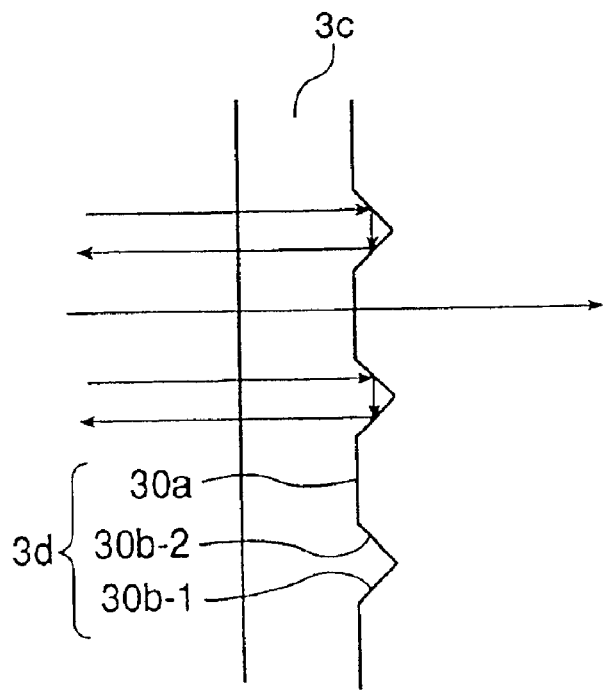
FIGS. 17A and 17B are sectional views of a scale according to the 11th embodiment of the present invention.
Figure 17B:
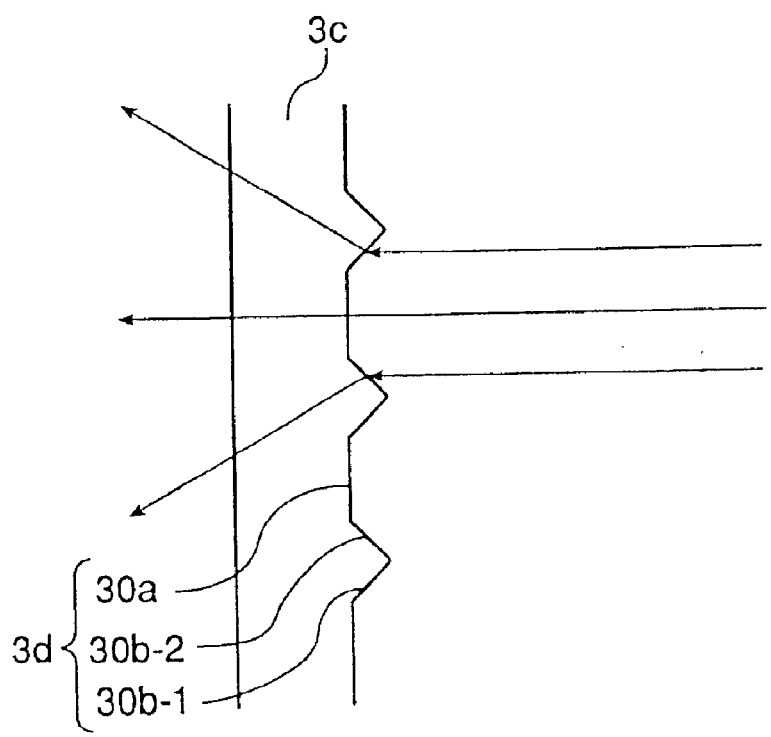
Figure 18A:
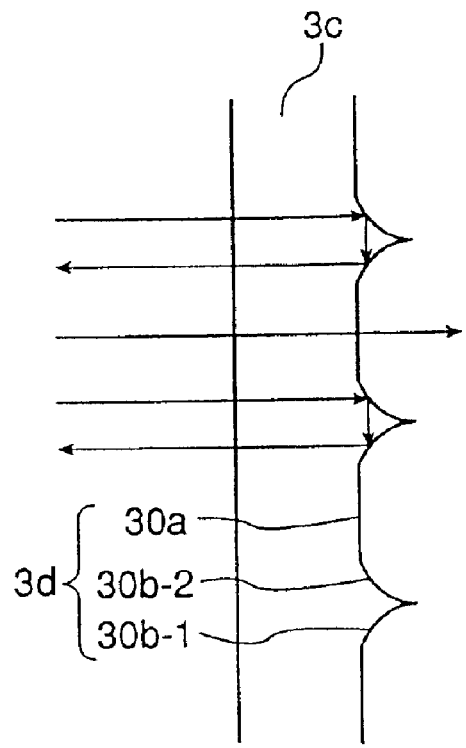
FIGS. 18A and 18B are a sectional views of a scale according to the 12th embodiment of the present invention.
Figure 18B:
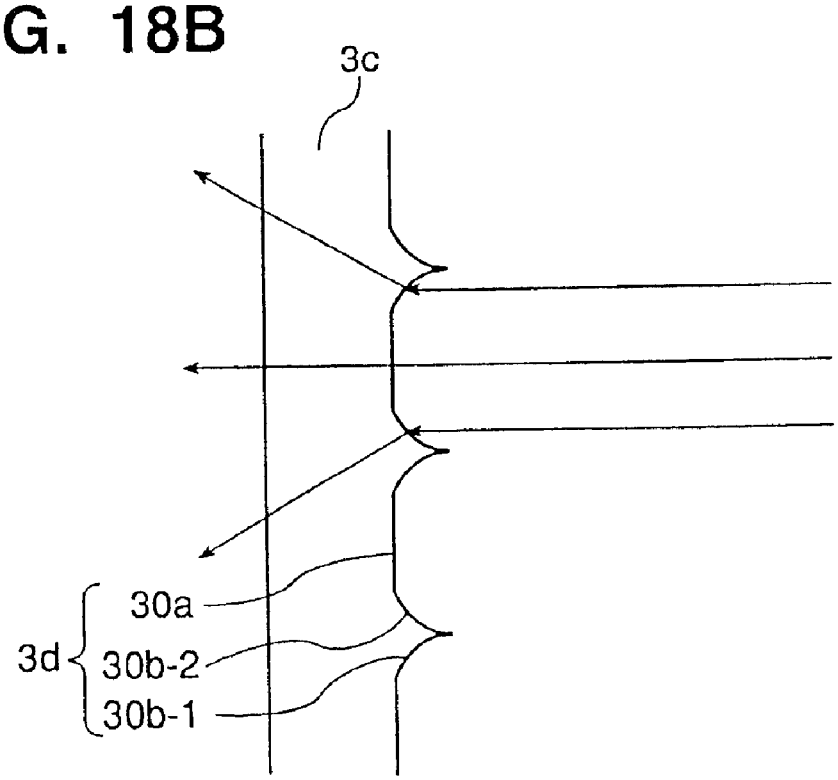
Figure 19A:
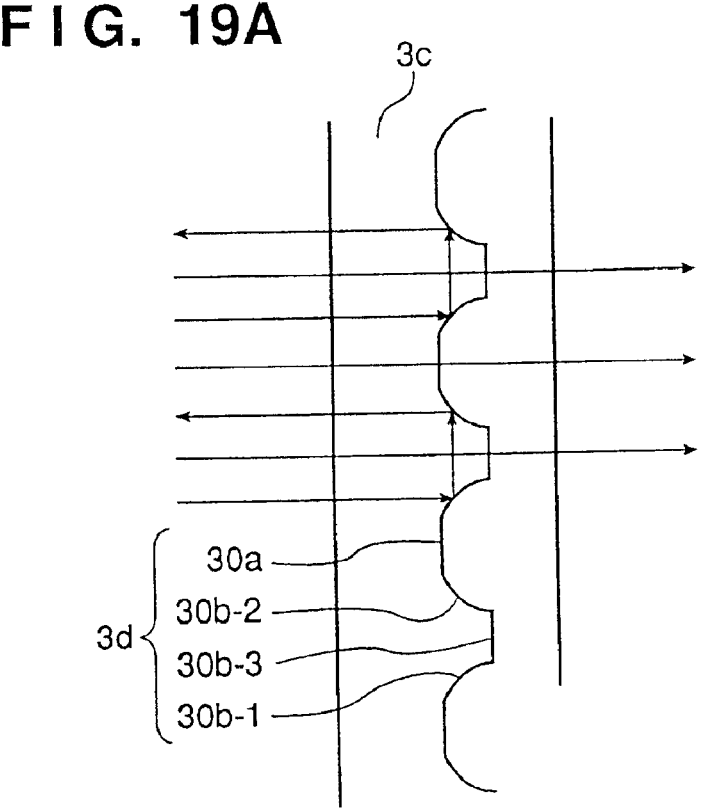
FIGS. 19A and 19B are sectional views of a scale according to the 13th embodiment of the present invention.
Figure 19B:
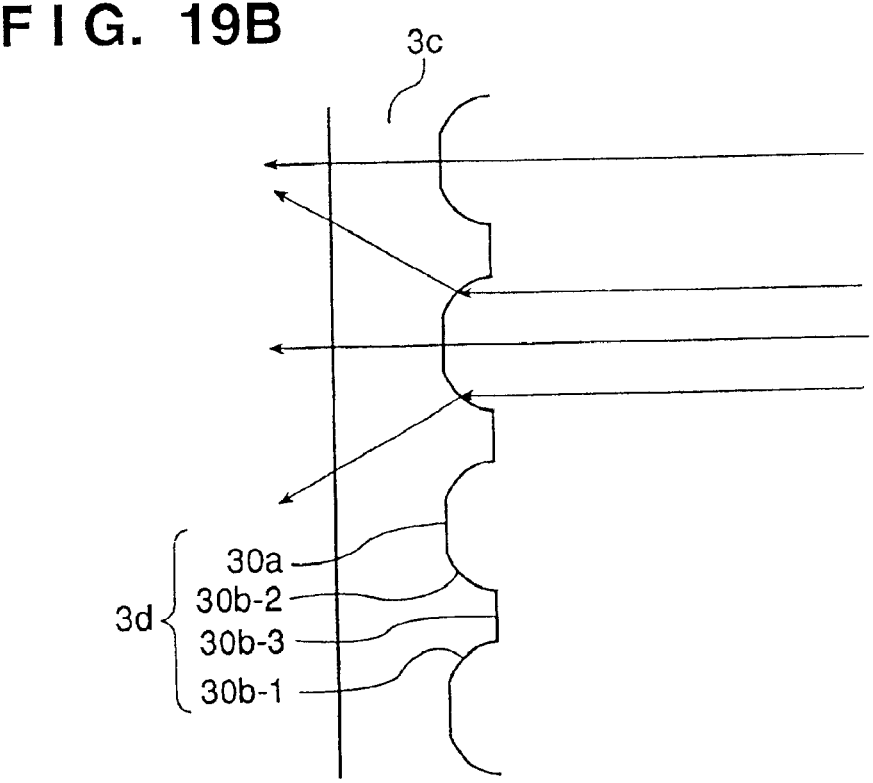

The third embodiment will be described next. FIG. 9 shows a mold arrangement according to the third embodiment.

As shown in FIG. 9, a mold portion 12 for forming a slit portion 11 also forms a shaft mount hole 3f, and the integral mold portion is disposed in a fixed platen 8. Therefore, the slit portion 11 and shaft mount hole 3f acquire stable coaxiality. The effect of this embodiment is the same as that of the first embodiment.

Fourth Embodiment

The fourth embodiment will be described next. FIG. 10 shows a mold arrangement according to the fourth embodiment.

As shown in FIG. 10, a mold portion 12 for forming a slit portion 11 also forms a shaft mount hole 3f, and the integral mold portion is disposed in a movable platen 7. Therefore, the slit portion 11 and shaft mount hole 3f acquire stable coaxiality. The effect of this embodiment is the same as that of the first embodiment.

Fifth to Eighth Embodiments

FIGS. 11 to 14 show a case where a scale 3 has a disk-like shape. The effect of each of these embodiments is the same as that of the first embodiment.

Ninth to 13th Embodiments

FIGS. 15 to 19 show the shapes of slit portions. All the shapes shown in FIGS. 15 to 19 have wavefront splitting functions, which split the wavefronts of a plurality of light-receiving elements and detect the position or speed of a moving object from the light intensities as in the first embodiment. Such a slit portion is formed in a scale surface by using the mold arrangement shown in FIGS. 8 to 14. The same effect as that of the first embodiment can be obtained.

As described above, according to the embodiments described above, an optical scale is made of a plastic material, and two mold portions, i.e., a mold portion for forming a shaft mount hole of the optical scale and a mold portion for forming a slit portion, are arranged in either a movable platen or a fixed platen. In addition, stable coaxiality can be obtained for the shaft mount hole and slit portion. This makes is possible to provide an optical scale capable of outputting high-precision movement information and a mold directly used to mold the scale.

14th Embodiment

Light transmission-type optical scales (encoders) have been described in the first to 13$^{th}$ embodiments. In the 14$^{th}$ embodiment, a light reflection-type optical scale (encoder) will be described.

Figure 20:
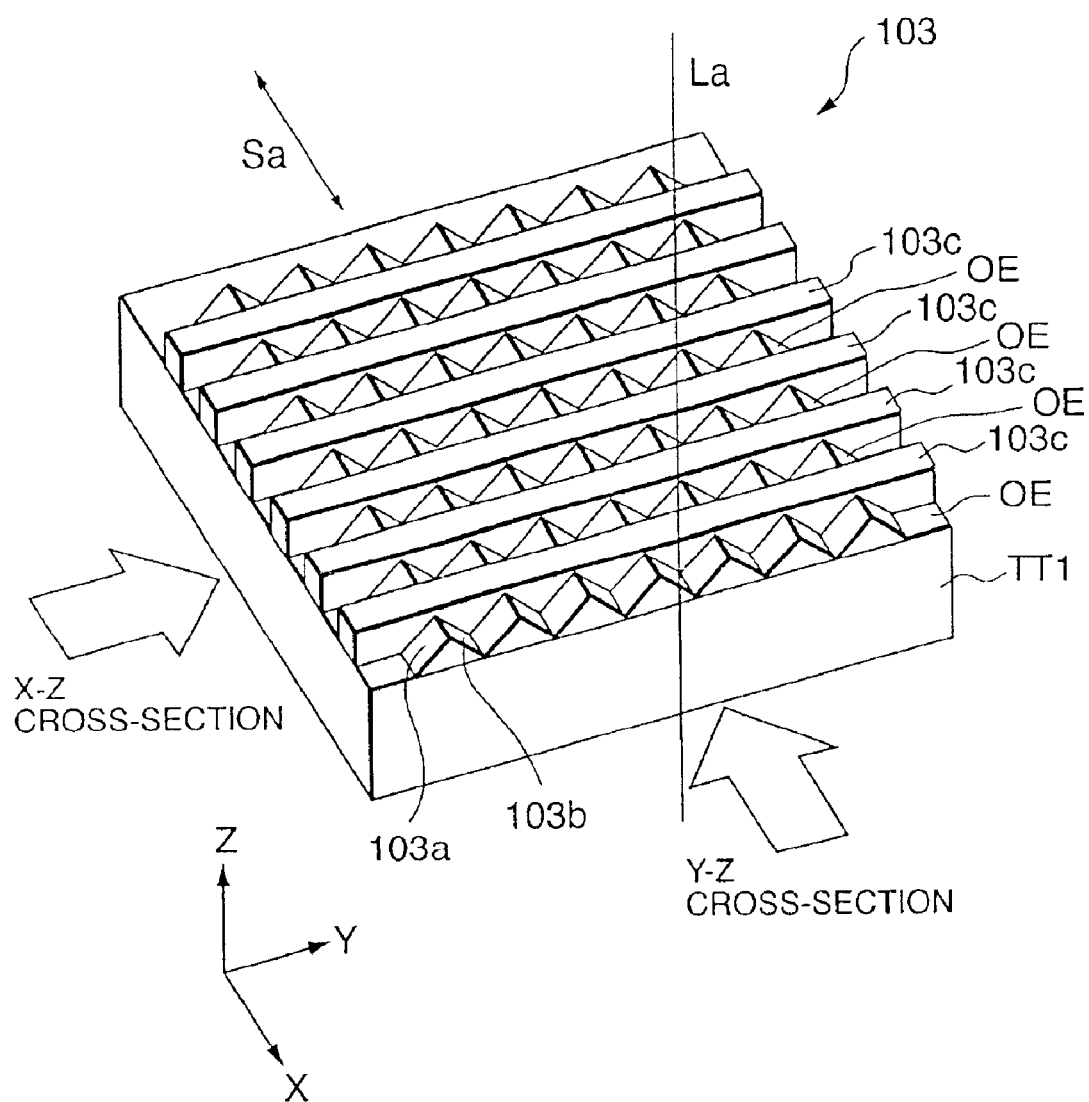
FIG. 20 is a perspective view showing a state where one-dimensional convergence reflecting elements are used for a linear encoder scale.

FIG. 20 is a perspective view showing the scale reflecting portion of an optical reflection-type encoder scale.

Referring to FIG. 20, reference numeral 103 denotes a reflector (reflecting scale) including a reflecting portion OE. In this embodiment, the reflecting portion OE indicates a plurality of V-grooves located in almost the center of the perspective view of FIG. 20. Reference numerals 103a and 103b denote two inclined surfaces forming a V-groove. The substrate of the reflector 103 on which the reflecting portion OE is formed is formed by a transmission member TT1 made of a transmission resin such as polymethylmethacrylate (PMMA), polycarbonate (PC), or norbornene (PCPD)-based transparent high-temperature resin "arton" (having heat resistance corresponding to a heat deformation temperature of 170° C.).

The reflector of this embodiment is designed such that a reflecting portion (micro roof mirror array) having a plurality of roof mirrors, each having the two reflecting surfaces 103a and 103b opposing each other at a predetermined angle (85° to 95°), arranged in a one-dimensional direction is formed on the surface of a transparent substrate (transmission resin).

In this case, as the roof mirror surface, a reflecting function by internal total reflection of a transmission resin or the reflecting surface of a metal mirror surface is used.

The optical function of the reflector of this embodiment will be described first in comparison with a conventional reflector.

Figure 26:
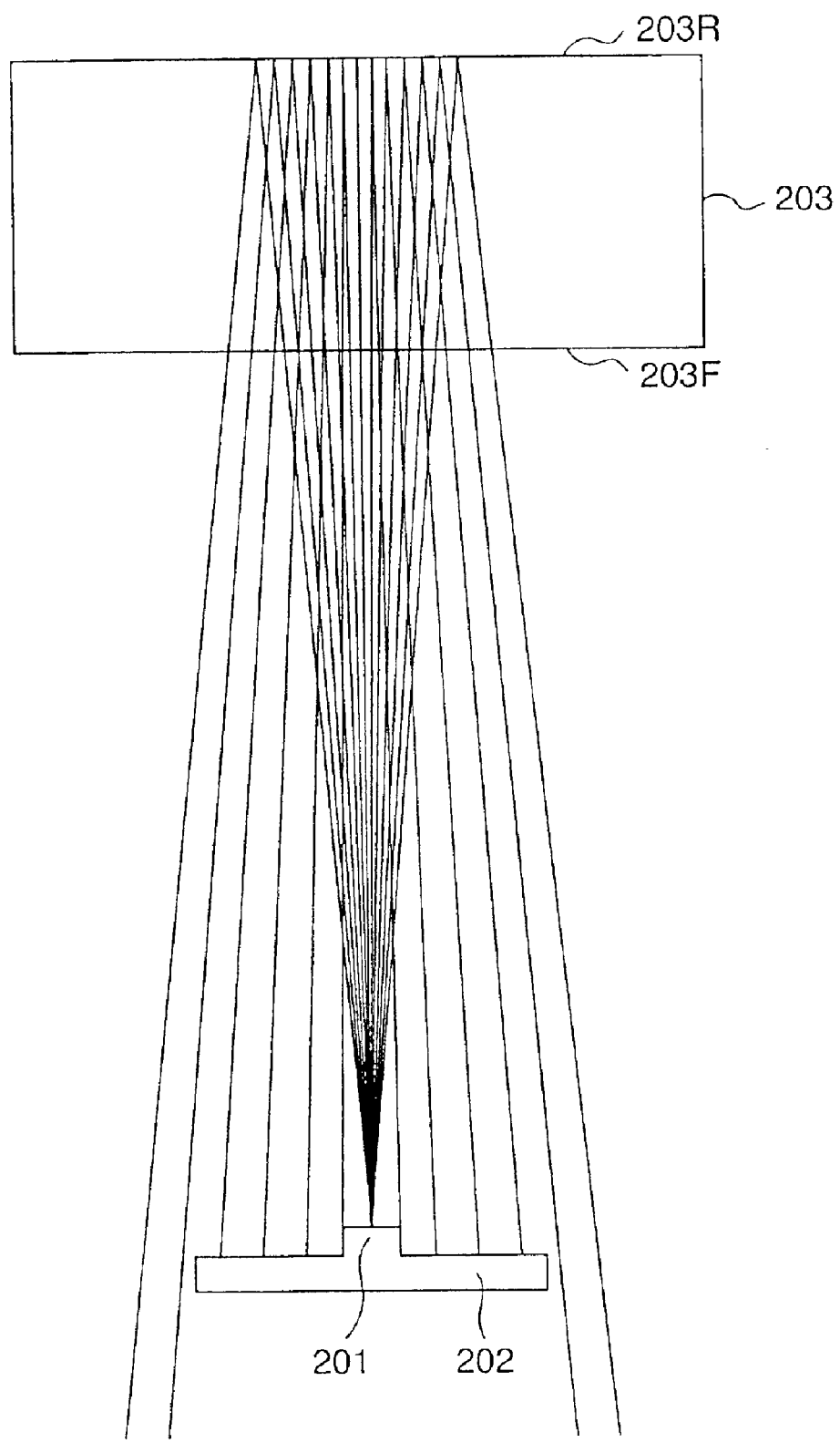
FIG. 26 is a schematic view showing optical paths of a conventional reflector.

FIG. 26 is a view for explaining a conventional reflector 203.

FIG. 26 shows a state where a divergent light beam from a light source 201 is incident on an incident surface 203F of the reflector 203, reflected by a reflecting surface 203R formed by a flat surface, and guided to a light-receiving portion 202 while the divergent angle of the beam is maintained.

Figure 27A:
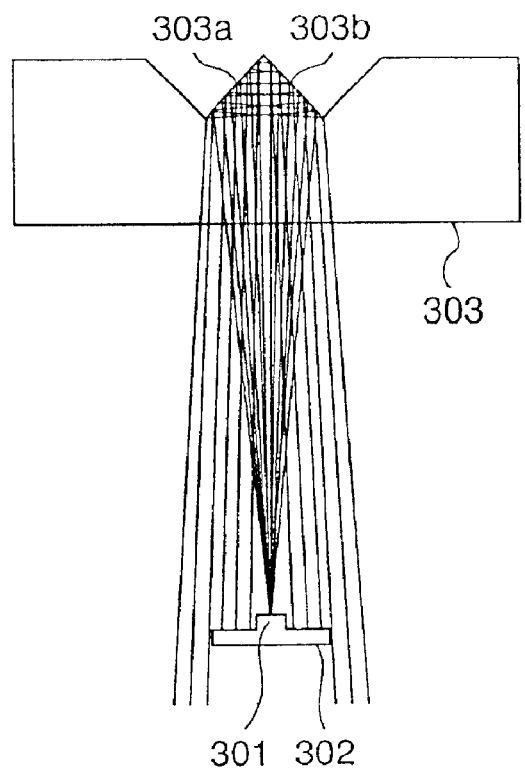
FIGS. 27A to 27C are schematic views showing optical paths of a reflector having two V-grooves.
Figure 27B:
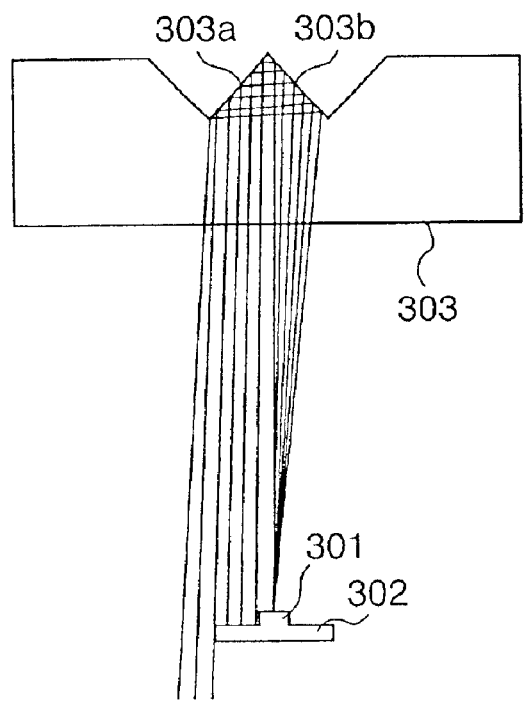
Figure 27C:
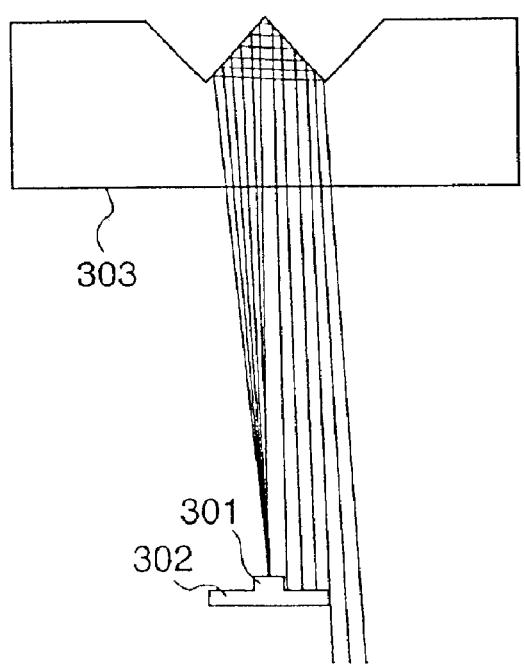

FIGS. 27A, 27B, and 27C show an optical path in a case where one roof mirror is used for a reflector 303.

FIGS. 27A to 27C show a case where a light beam is reflected by one roof mirror having two reflecting surfaces 303a and 303b opposing each other at a predetermined angle.

Referring to FIG. 27A, light beams from a light source 301 which are reflected in all directions are guided to a light-receiving portion 302 at a divergent angle almost equal to that shown in FIG. 26.

A divergent light beam from the light source 301 is split by the two reflecting surfaces 303a and 303b, and the resultant divergent light beams propagate to the light-receiving portion 302 without overlapping each other.

FIGS. 27B and 27C show a state where a divergent light beam from the light source 301 which is reflected is split into two light beams.

Referring to FIGS. 27B and 27C, a light beam emitted from the light source 301 in one direction is split by the two inclined surfaces 303a and 303b forming a roof mirror.

For example, in the case shown in FIG. 27B, a light beam emitted from the light source 301 to the right side is guided to the left on the light-receiving portion 302 side. Light beams split/separated by the roof mirror propagate to the light-receiving portion 302 without overlapping each other.

Figure 28:
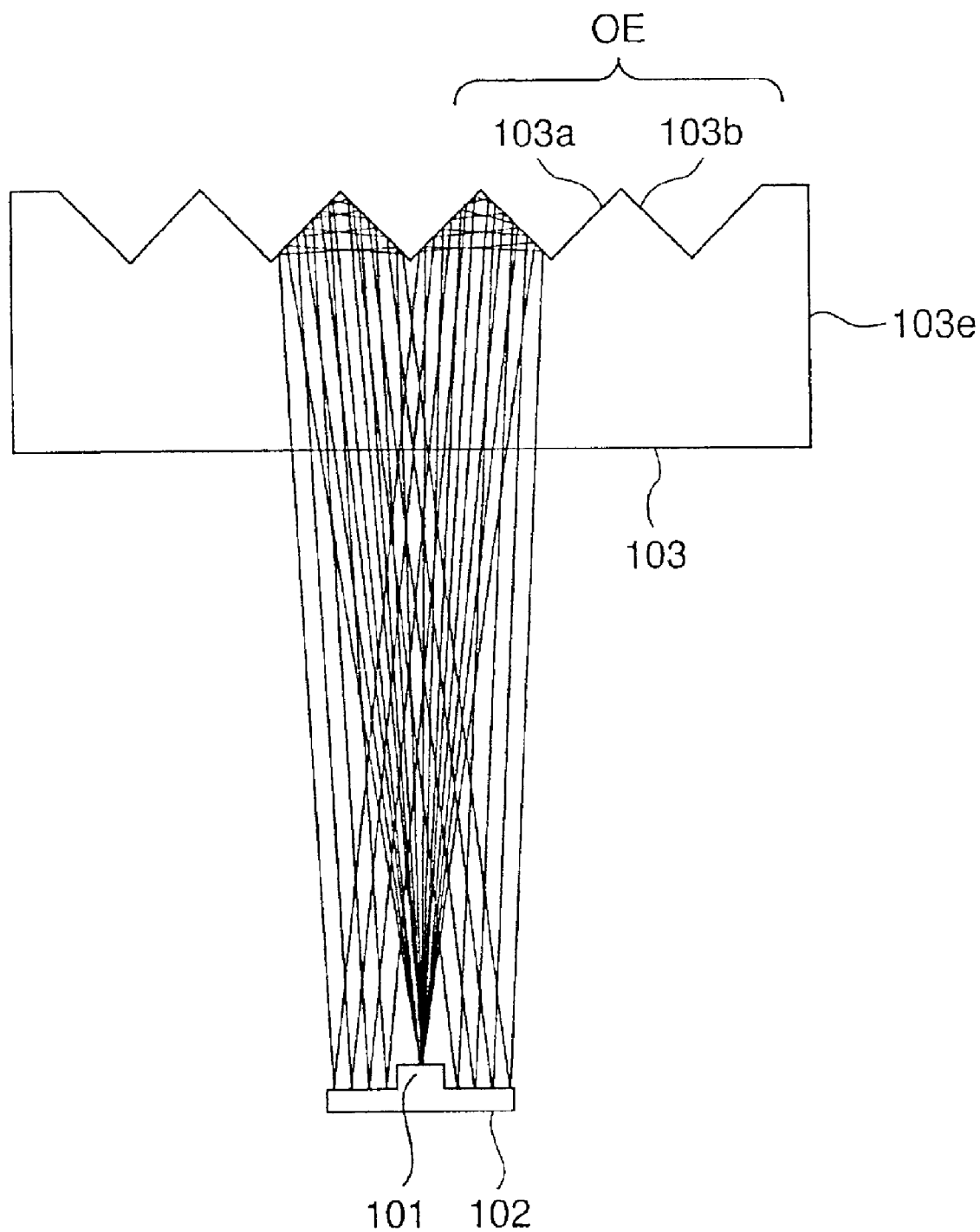
FIG. 28 is a schematic view showing the optical paths of the reflector according to the 14th embodiment.

FIG. 28 is a view for explaining the optical function of a reflector 103 of this embodiment.

The reflecting portion OE obtained by forming in an array a plurality of roof mirrors, each having two reflecting surfaces 103a and 103b opposing each other at a predetermined angle, in a one-dimensional direction is formed on one surface of a transparent substrate 103e.

A divergent light beam from a light source 101 is reflected by the reflecting portion OE of the reflector 103, and then the resultant light beams overlap each other at an arbitrary position (a light-receiving portion 102 or its neighboring portion).

A divergent light beam from the light source 101 almost falls within the surface of the light-receiving portion 103, and a light beam emitted from the light source 101 with a divergent angle almost falls within the surface of the light-receiving surface 102, thus increasing the density of light beams on the light-receiving surface 102.

FIGS. 29A to 29D show a state where a light beam from the light source 101 which diverges in various directions is incident on the reflector 103 and split into a plurality of light beams by a plurality of roof mirrors and reflected by the roof mirrors, and the resultant light beams reflected by the respective roof mirrors overlap each other at an arbitrary position (the light-receiving portion 102 or its neighboring portion).

In any case, light beams reflected by the reflector 103 overlap each other at the light-receiving portion 102 or its neighboring portion.

Figure 29A:
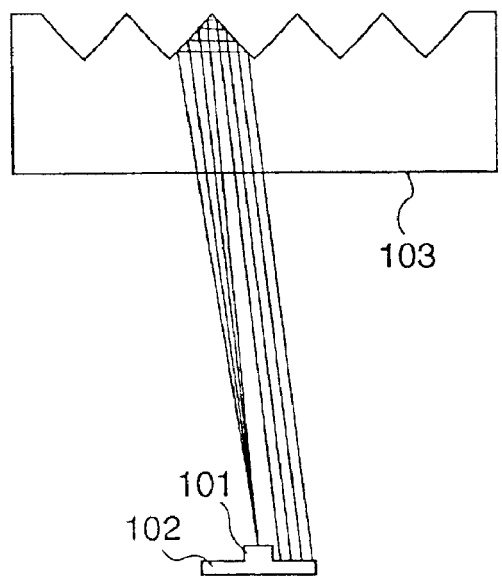
FIGS. 29A to 29D are schematic views showing the optical paths of the reflector according to the 14th embodiment.
Figure 29B:
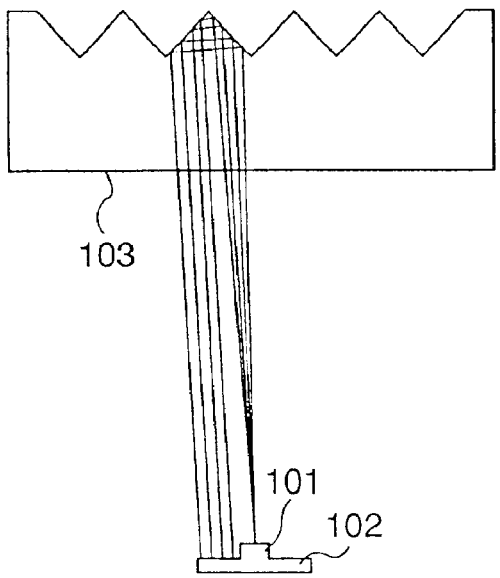
Figure 29C:
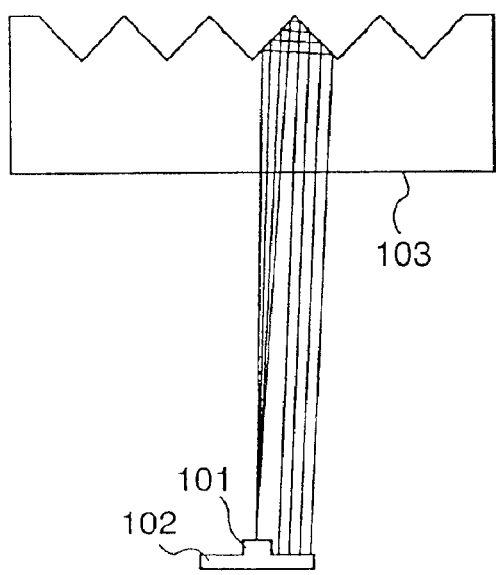
Figure 29D:
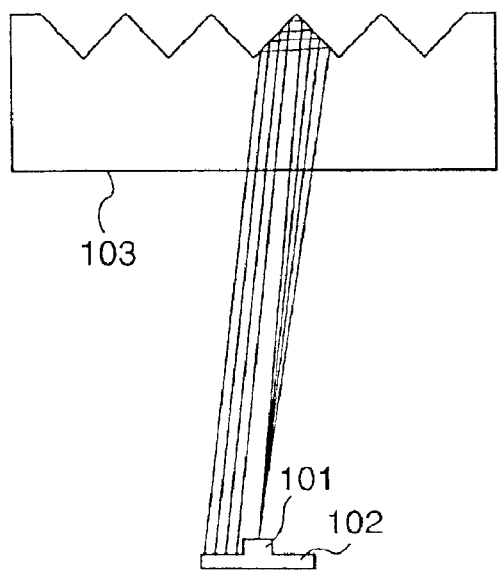

Although light beams from the inclined surfaces of the respective roof mirrors are split/separated, the reflected light beams shown in FIGS. 29A and 29D overlap each other on the light-receiving portion 102, and the reflected light beams shown in FIGS. 29B and 29C overlap each other in the same area on the light-receiving portion 102.

Figure 30A:
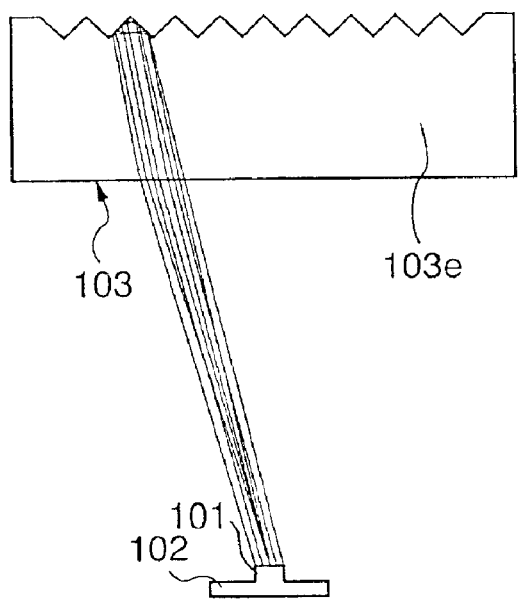
FIGS. 30A and 30B are schematic views showing the optical paths of the reflector according to the 14th embodiment.
Figure 30B:
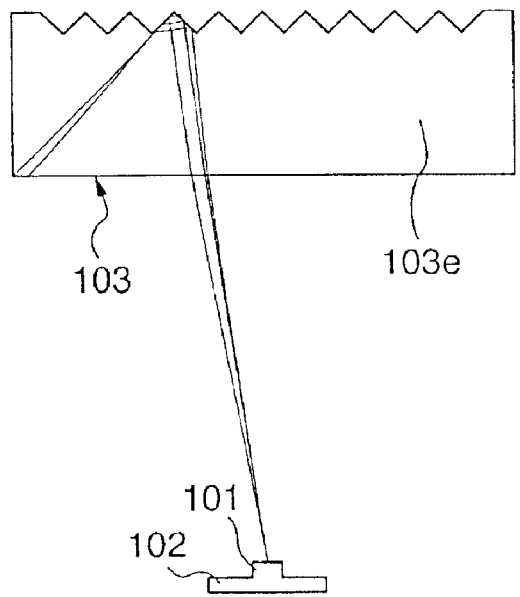

FIGS. 30A and 30B are views for explaining a difference in ray effect due to the difference in refractive index between materials for transmission members used for the substrate of the reflector 103.

FIG. 30A shows a case where the material for the transmission member 103e has a refractive index of 1.69. FIG. 30B shows a case where the material has a refractive index of 1.53.

As the refractive index of a material increases, the critical angle decreases, and the range of ray incident angles for total reflection is relaxed. The reflector in this embodiment uses a transmission member having a high refractive index (1.65 or more) to improve the usage efficiency of light.

FIGS. 31A to 32C show how reflected light beams are focused differently depending on the number of roof mirrors constituting a reflecting portion.

Figure 31A:
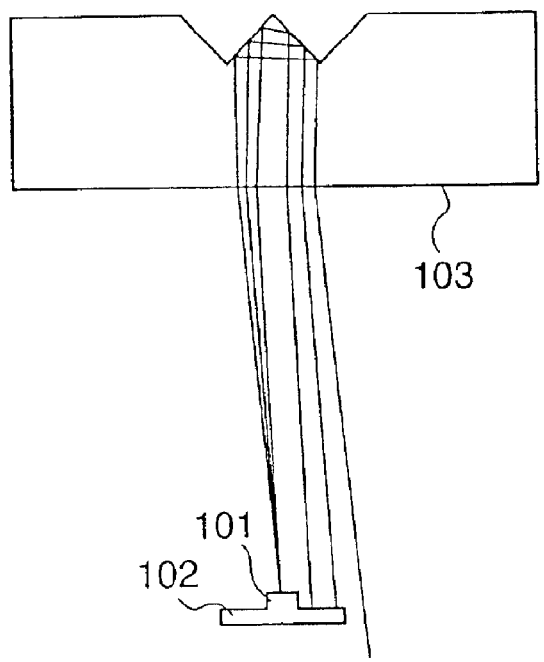
FIGS. 31A to 31C are schematic views showing the optical paths of the reflectors according to the 14th embodiment.
Figure 31B:
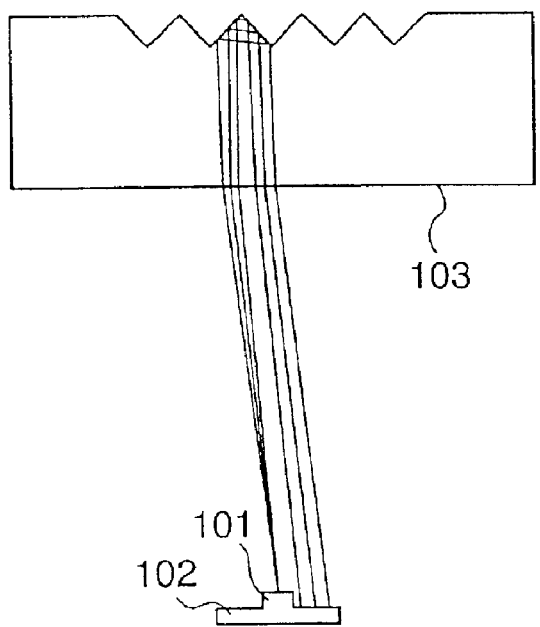
Figure 31C:
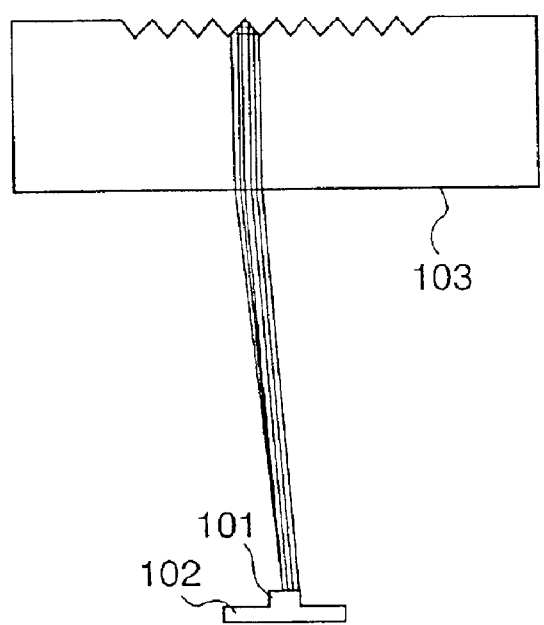

Referring to FIGS. 31A to 31C, as the number of roof mirrors increases, the angle (θr) at which a reflecting surface per inclined surface covers the light source 101 decreases. At the same time, the light amount of one light beam of split light beams decreases, and the irradiation area on the light-receiving surface 102 to which the reflected light beams are guided also decreases.

An increase in the number of roof mirrors cancels out a decrease in light amount, so the total light amount remains the same to obtain only the effect of reducing the irradiation area on the light-receiving portion 102.

Figure 32A:
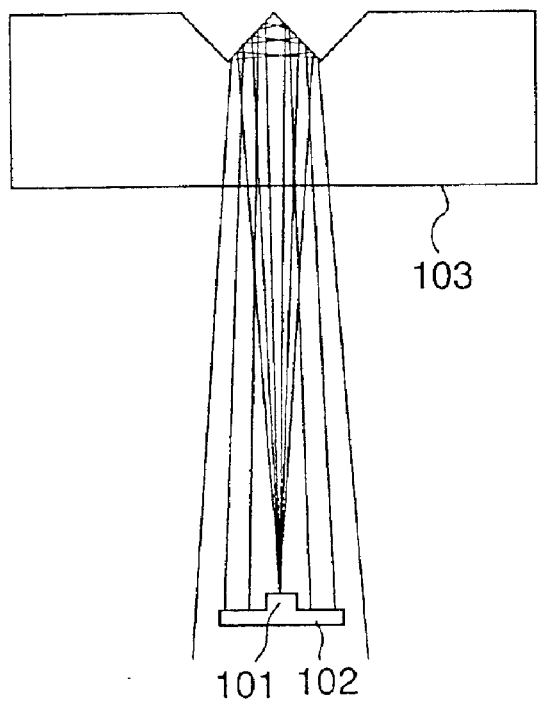
FIGS. 32A to 32C are schematic views showing the optical paths of the reflectors according to the 14th embodiment.
Figure 32B:
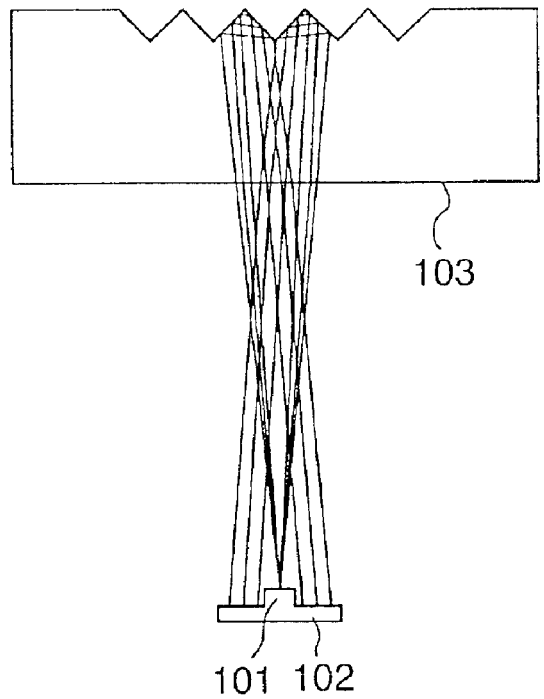
Figure 32C:
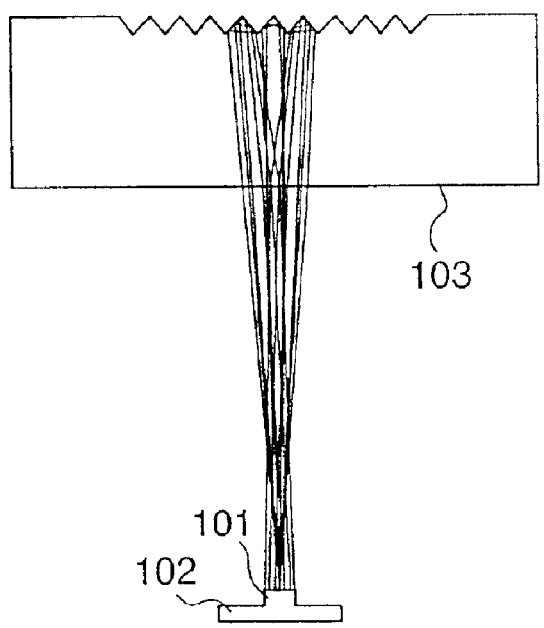

FIGS. 32A to 32C show a case where light beams emitted from the light source 101 are incident on the reflector 103 with the same divergent angle with the distance to the light source remaining the same. Referring to FIGS. 32A to 32C, the ray density of light beams guided onto the light-receiving portion 102 increases with a decrease in the pitch of roof mirrors.

The above arrangement is the basic arrangement of the reflecting portions in this embodiment.

Figure 33:
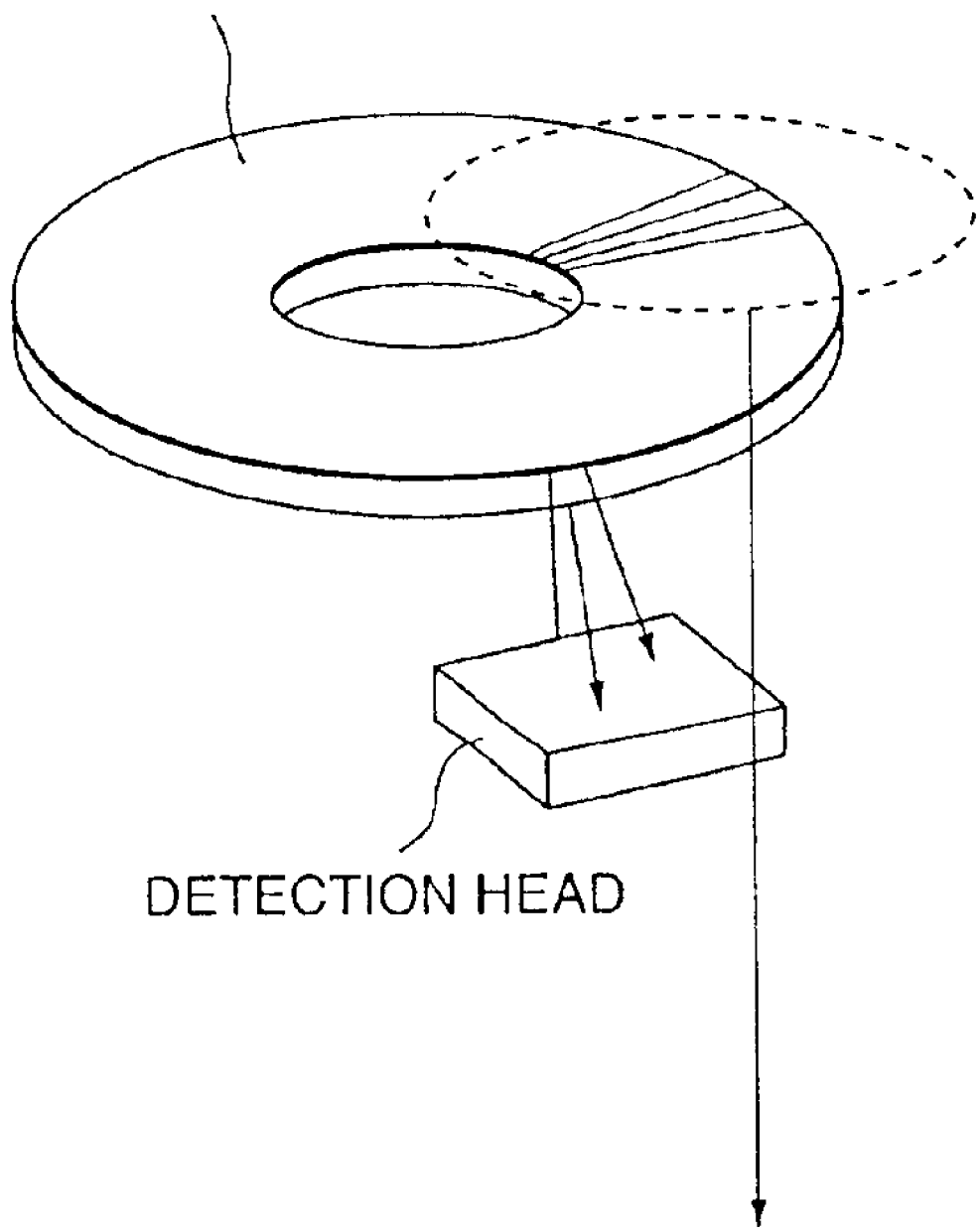
FIG. 33 is a perspective view showing the arrangement of a rotary encoder according to the 14th embodiment.

FIG. 33 is a perspective view showing an outline of the arrangement of a rotary scale including a rotary encoder having these reflecting portions.

Figure 34:
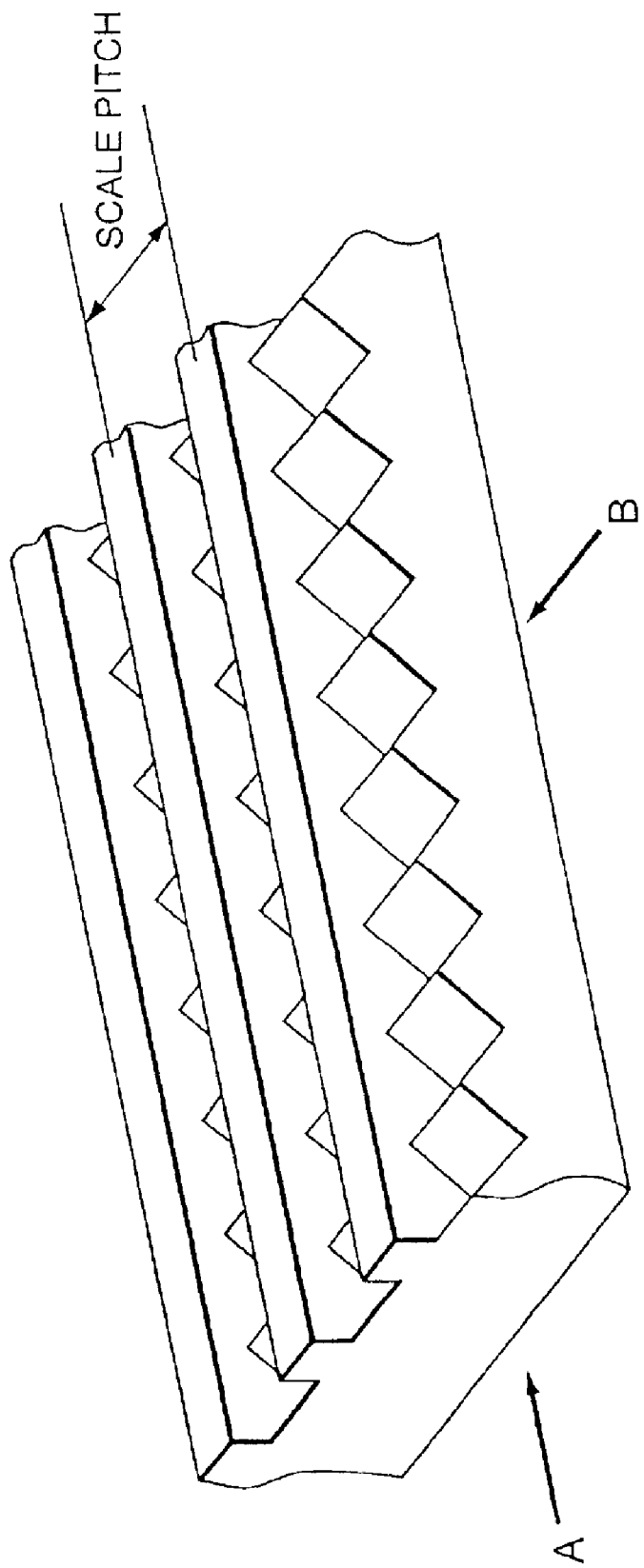
FIG. 34 is a perspective view showing the arrangement of a rotary encoder scale according to the 14th embodiment.

FIG. 34 is a perspective view showing the arrangement of reflecting portions that are radially arranged.

Figure 35:
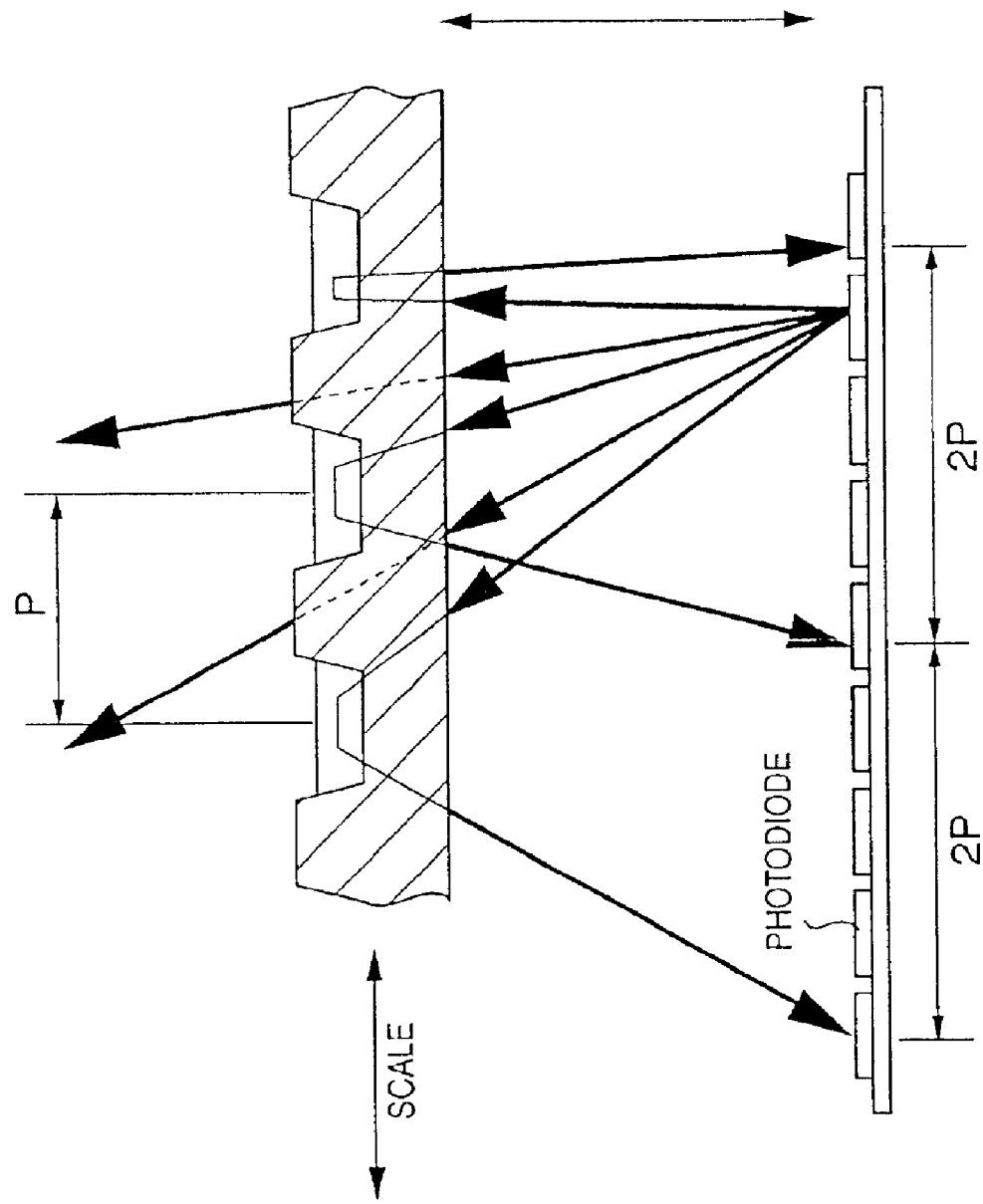
FIG. 35 is a schematic view showing optical paths of the reflector according to the 14th embodiment.
Figure 36:
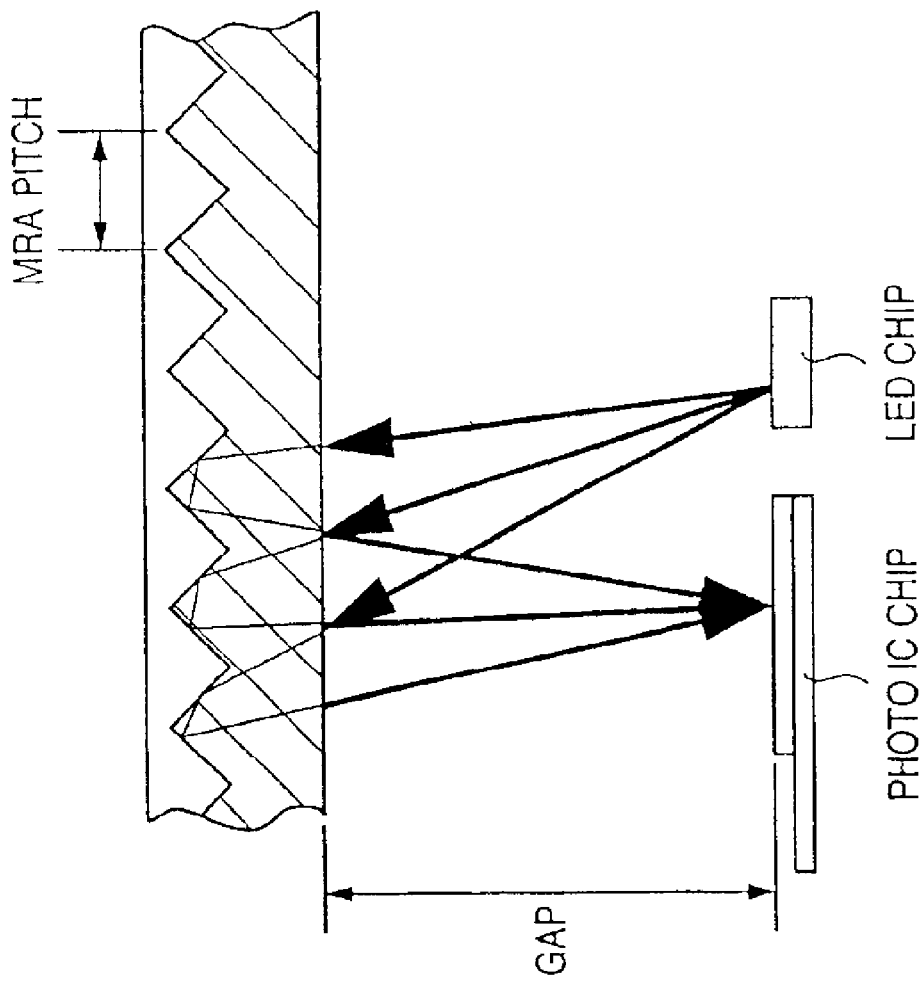
FIG. 36 is a schematic view showing optical paths of the reflector according to the 14th embodiment.

FIGS. 35 and 36 are views taken in the directions indicated by arrows A and B in FIG. 34.

The optical effect of the reflecting element (reflector) of this embodiment will be described next with reference to FIG. 20.

Light beams (not shown) from a sensor light source forming a photosensor are applied onto the reflector 103 from below the reflector 103 in FIG. 20 (the surface opposing the surface in which V-grooves are formed) and propagate in the transmission member TT1. Of these light beams, a light beam that has reached a V-groove portion is totally reflected twice by the effect of internal total reflection to be returned to the space on the light source 101 side of the photosensor. This light beam is then guided to a sensor light-receiving portion forming the photosensor. Referring to FIG. 20, reference symbol Sa denotes the displacement direction of the reflector 103.

A reflecting portion of the reflector 103 is formed by a plurality of continuous V-grooves. More specifically, a "V-groove group" OE having these V-grooves continuously arrayed forms a reflecting portion serving as an optical element.

In this embodiment, reference symbol La in FIG. 20 denotes a normal to the light-emitting surface of the light source of a reflection encoder (not shown). This normal La coincides with the principal ray of light beams emitted from the light source and applied onto the reflector 103. This principal ray and the reflection scale (reflector 103) cross each other almost vertically.

Figure 21:
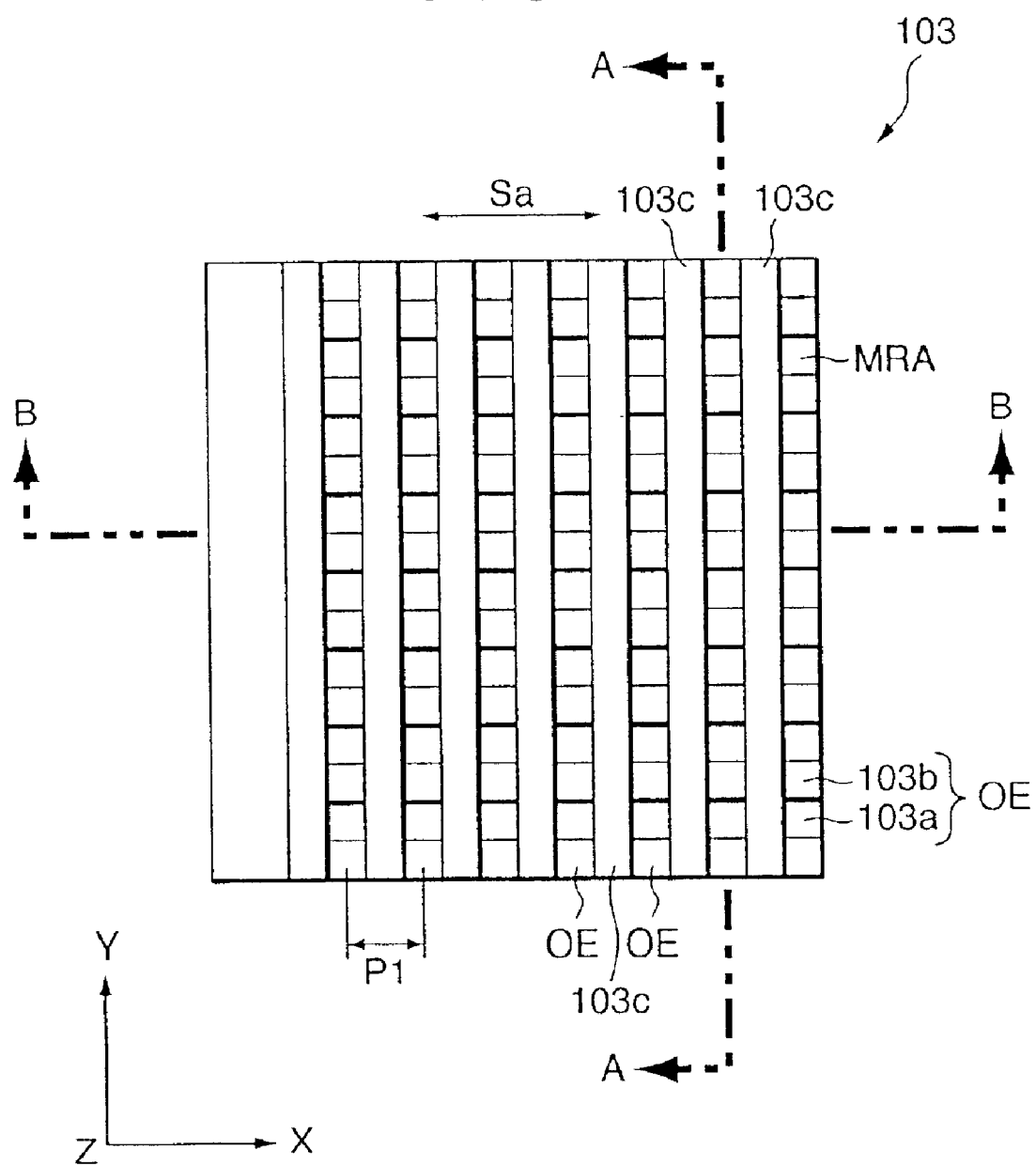
FIG. 21 is a plan view of the linear encoder scale in FIG. 20 when viewed from the direction of the optical axis of the light source.

FIG. 21 is a view from the upper surface (Z-axis direction) of the reflector 103 as the reflection linear encoder scale of the 14th embodiment.

The reflecting elements OE in this embodiment are arranged at a pitch P1 along the displacement measurement direction Sa. This pitch P1 corresponds to the scale pitch of the reflection encoder scale and determines a measurement resolution in displacement measurement by the sensor.

The characteristic features of the reflector 103 will be further described below with reference to sectional views taken along lines A—A and B—B in FIG. 21.

Figure 22:
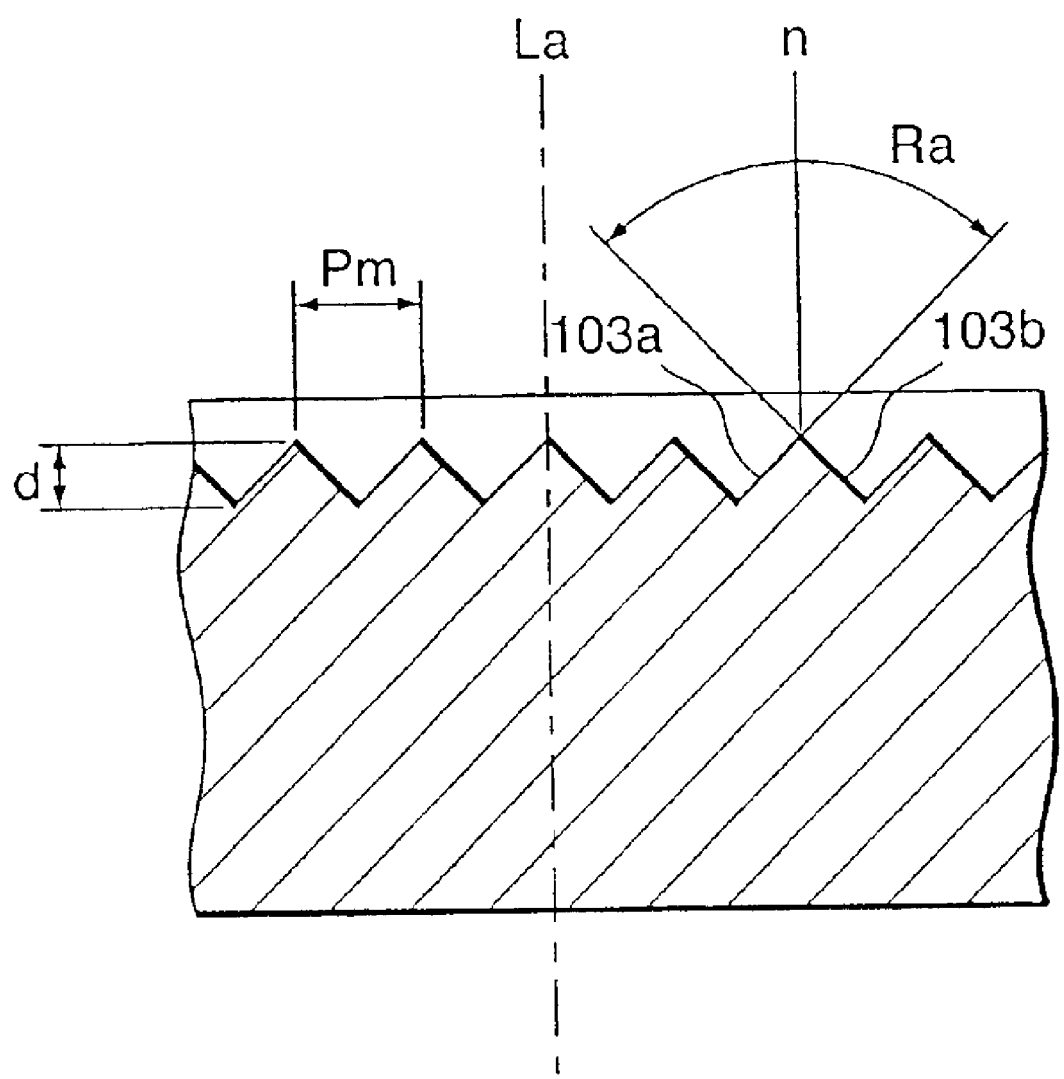
FIG. 22 is a sectional view taken along a line Y–Z of the linear encoder scale in FIG. 20 (taken along an arrow A—A in FIG. 21)
Figure 23:
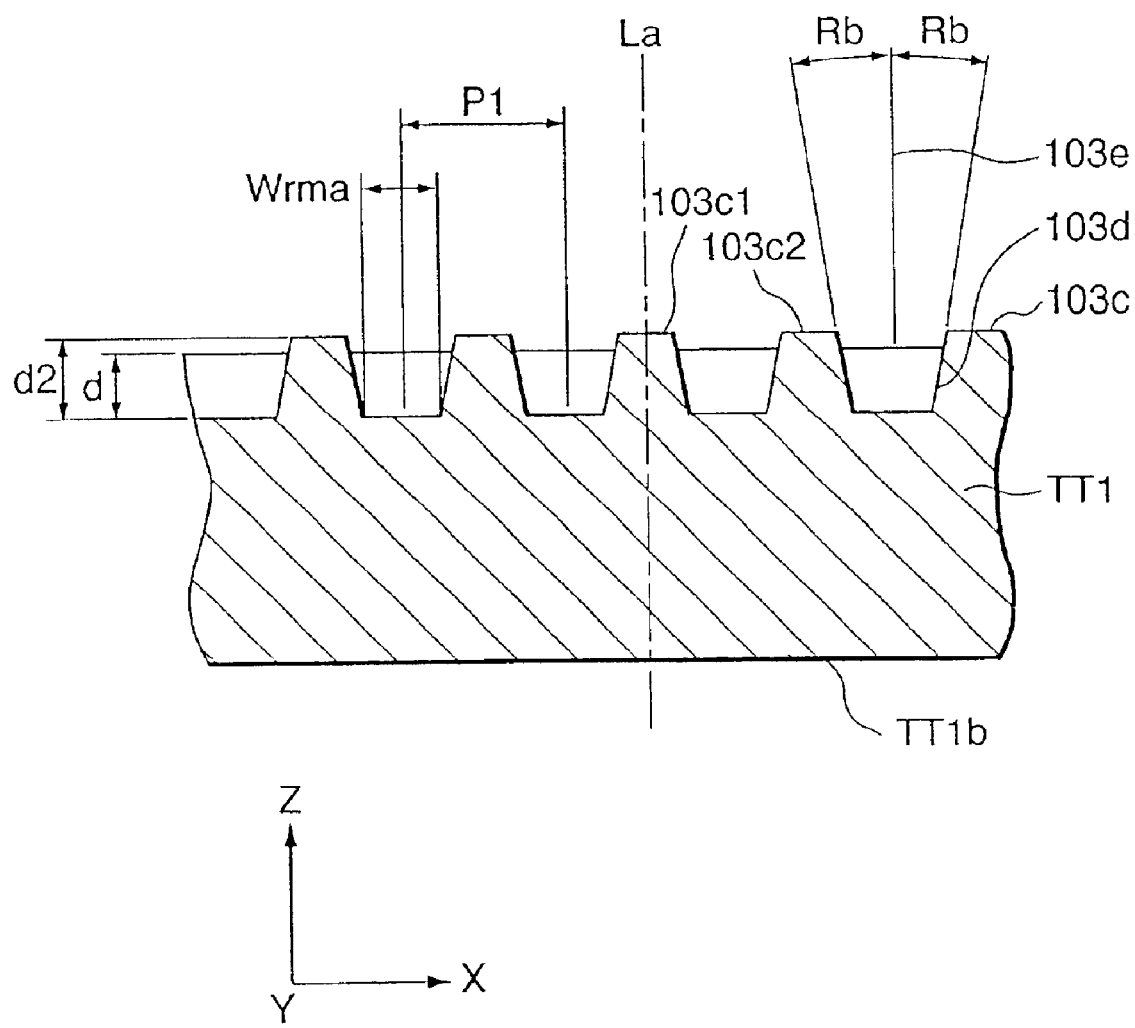
FIG. 23 is a sectional view taken along a line X–Z of the linear encoder scale in FIG. 20 (taken along an arrow B—B in FIG. 21)

FIGS. 22 and 23 are sectional views taken along the lines A—A and B—B in FIG. 21. The reference numerals used in FIGS. 22 and 23 will be described below:

103a, 103b: two inclined surfaces constituting the V-groove OE,

Ra: the angle (the angle of aperture of the V-groove) defined by the two inclined surfaces 103a (103a1, 103a2, . . . ) and 103b (103b1, 103b2, . . . ), Pm: the array pitch of V-grooves, d: the depth of the V-groove, P1: the array period (=encoder scale pitch) of reflecting elements OE; an example of a specific design value set in this embodiment as the above shape parameter is P1≈169 μm, Pm≈100 to 200 μm, Ra≈95°, Wrma≈85 μm, and d2≈Pm/2+10 μm d≈Pm/2 (50 to 100 μm)

In addition, referring to FIG. 22, reference symbol n denotes a straight line parallel to the principal ray La from the light source. This straight line bisects the angle defined by the V-groove in this embodiment.

Referring to FIG. 23, a surface 103c is a flat portion existing between V-groove groups. A light beam applied from a lower surface TT1b onto this flat portion is transmitted therethrough without being totally reflected and is not incident on the light-receiving element portion on the encoder side.

An angle Rb defined by an inclined surface 310d of the concave portion between the surfaces 103c and a normal 103e and by the surface 103c is the draft of the mold which is required when the reflecting scale 103 is manufactured by injection molding. More specifically, Rb≈3° to 5°.

As described above, the 14th and 15th embodiments use the internal total reflection effect of the transmission member using a plurality of continuous V-groove groups. Therefore, the reflector 103 substantially has a light beam reflecting function without coating the surface of the substrate with an aluminum reflecting film or the like.

The reflector 103 in this embodiment is a transmission member using an internal total reflection effect. When Ra=90° and the pitch Pm is set to a value that raises no problem, the arrangement shown in FIG. 24 can be used as an practicable arrangement on the photosensor side.

Figure 24:
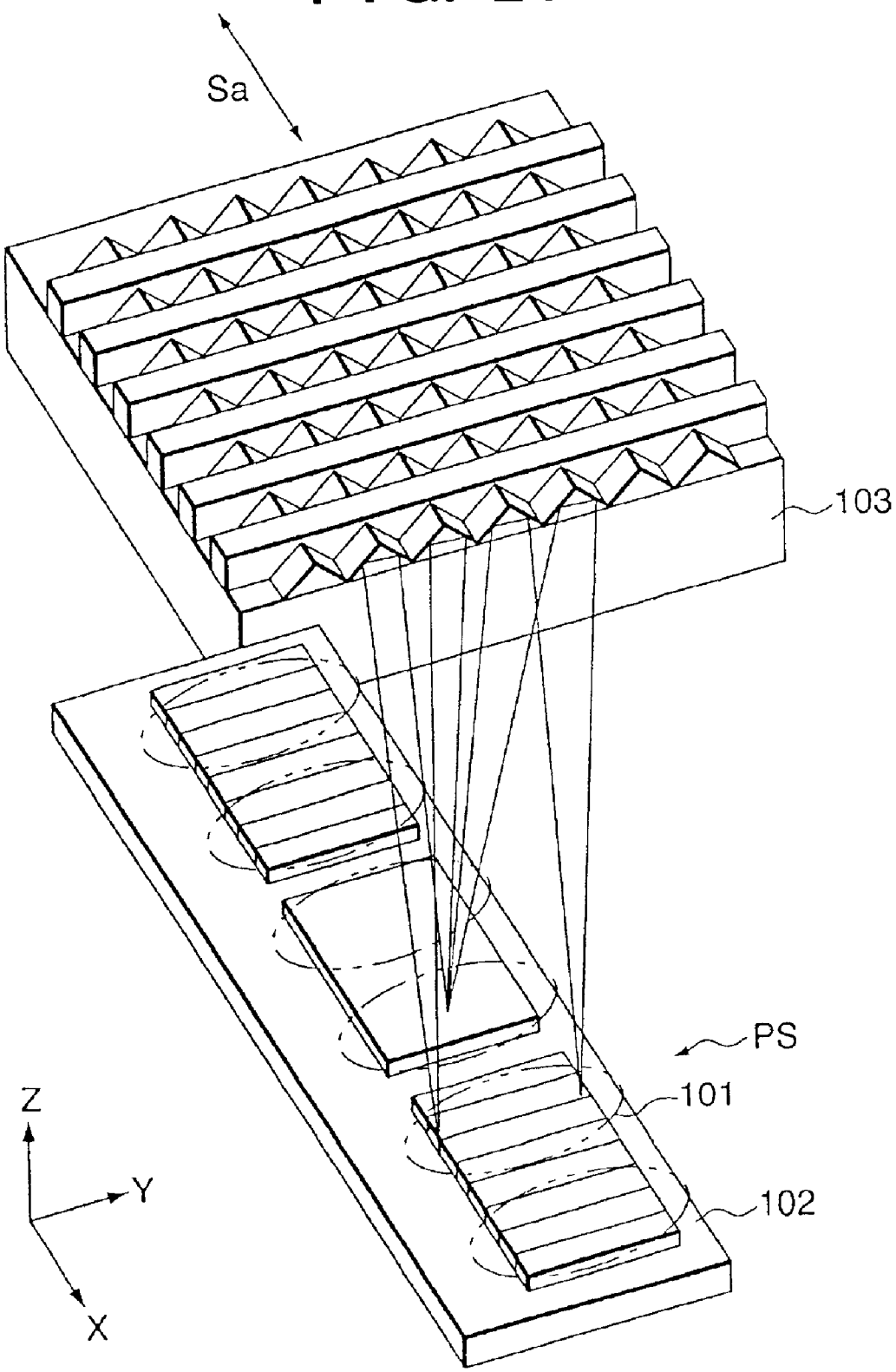
FIG. 24 is a perspective view showing reflection optical paths of a reflection scale according to the 14th embodiment without any offset.

Referring to FIG. 24, the reflector 103 is formed by a transmission member with angle Ra=90°.

In this case, the above problem can be avoided by mounting an LED chip 101 on a silicon photodiode chip of a light-receiving element 102. This arrangement is preferable because it has a high packing density, but consideration must be given to the generation of heat by the LED chip 101.

Figure 25:
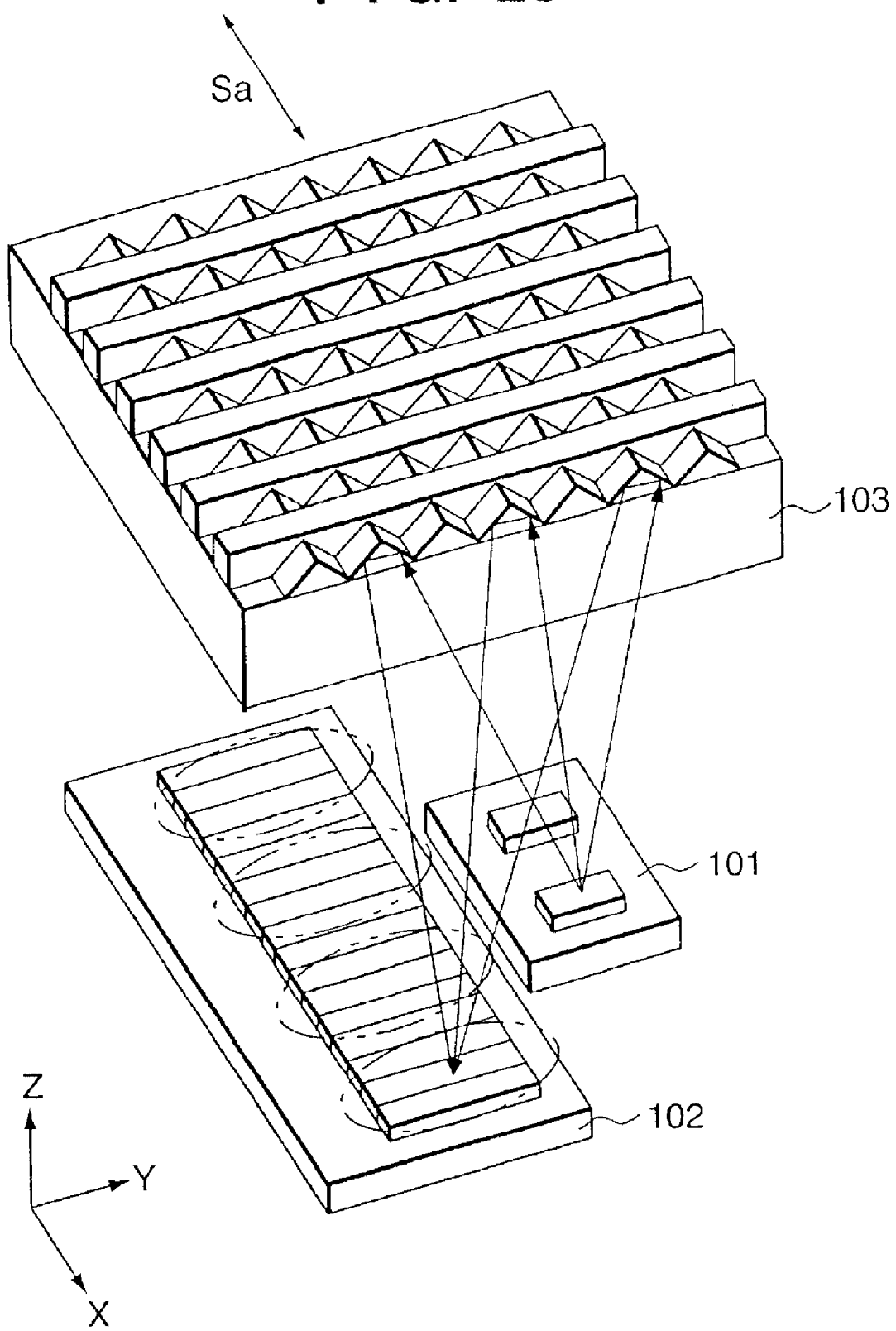
FIG. 25 is a perspective view showing reflection optical paths of the reflection scale according to the 14th embodiment with an offset.

From the viewpoint of mounting, the silicon photodiode 102 and LED chip 101 are preferably mounted on a single mount surface as shown in FIG. 25 with an angle offset (an angle larger than 90°).

As an effective means, this angle Ra is preferably set to an angle larger than 90°.

The optical function of the scale has been described so far. By using such a groove shape, the function of an optical reflection encoder scale can be realized.

The relationship between the structure of a mold for forming this scale with high precision and a detection head obtained by attaching this scale as an encoder unit to a shaft whose rotational angle is to be detected will be described next.

Figure 37:
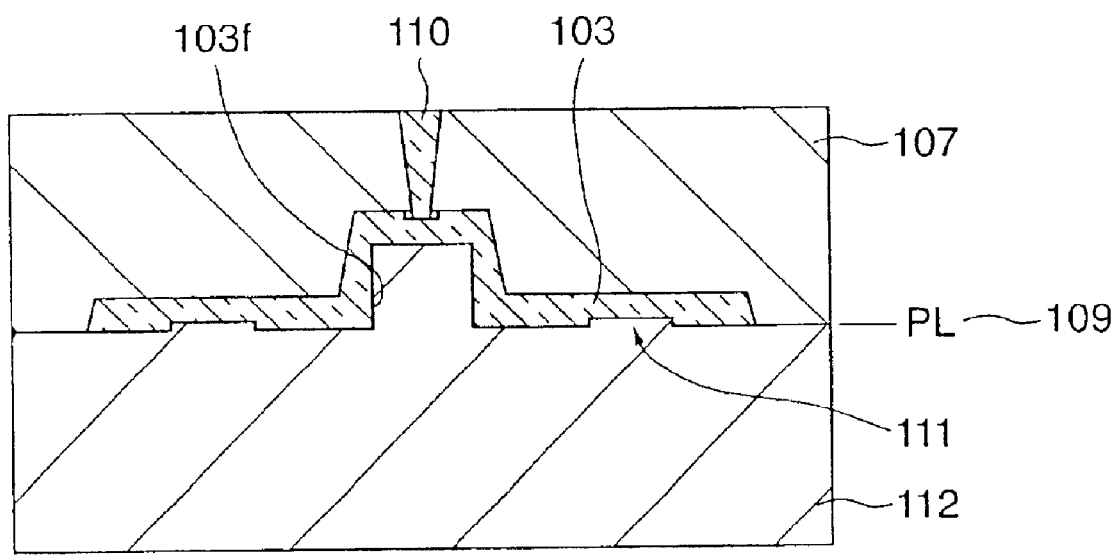
FIG. 37 is a sectional view of a mold for a scale according to the 14th embodiment.
Figure 39:
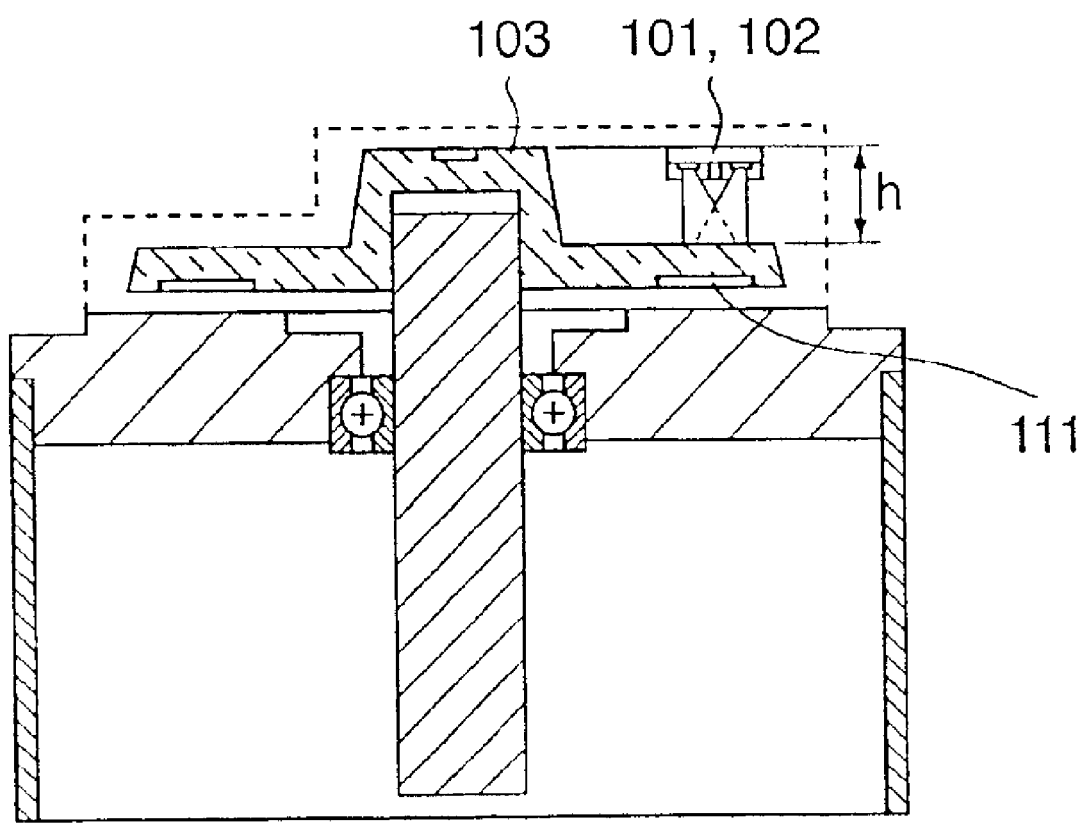
FIG. 39 is a schematic view showing the arrangement of the rotary encoder according to the 14th embodiment.

FIG. 37 is a view showing a mold structure for forming the scale according to this embodiment.

A shaft mount portion 103f and ray reflection functioning portion (V-groove) 111 are formed by using a single mold portion. The scale 103 of this embodiment is formed by using a movable platen 112 and a fixed platen 107 having one pin disk gate 110. With this structure, a molten resin uniformly flows around the pin gate located in the center in the radial direction to obtain uniform characteristics and precision in the circumferential direction in terms of stress distribution and dimensional precision. In addition, since the reflecting portion and shaft fitting portion are arranged in the same mold portion, a molded product having a shape like the one shown in FIG. 38 is obtained. When this scale is mounted on the rotating shaft of a motor or the like, the reflecting portion is located near the bearing. Even if, therefore, turning (whirling) of the shaft occurs due to bearing backlash and play, eccentricity errors and vertical movement of a reflecting surface in the axial direction can be made low. In addition, a detection head can be housed within a height h of a projection portion for ensuring the fitting length of the scale, producing a great effect in reducing the profile of the unit.

Figure 42:
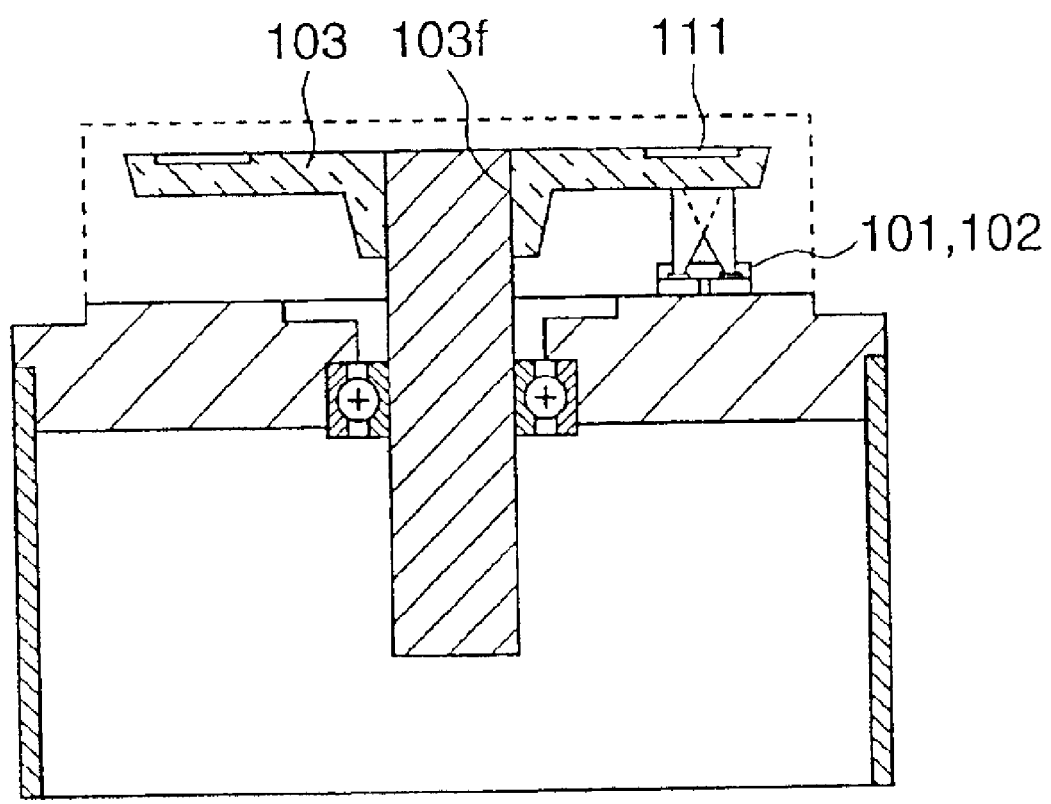
FIG. 42 is a schematic view showing the arrangement of another example of the rotary encoder according to the 14th embodiment.

FIG. 40 is a view showing a scale shape according to another embodiment, which has the same mold structure as that shown in FIG. 37. However, this structure is cut along a cutting line CL in FIG. 41 to form a through hole. In this case, as an encoder unit, the reflector 103 and head are arranged as shown in FIG. 42. As compared with the preceding embodiments, although the volume occupied by the encoder unit increases, since detection heads 101 and 102 and bearing members are arranged on the same member, a layout which is advantageous in terms of positioning precision between the heads 101 and 102 and the scale 103 can be realized. In this case as well, as in the preceding embodiments, since the shaft fitting portion 103f and reflecting portion 111 are formed by the same mold portion, the relationship between the reflecting portion pattern center as a single part and the shaft fitting hole can be maintained with high precision.

Figure 43:
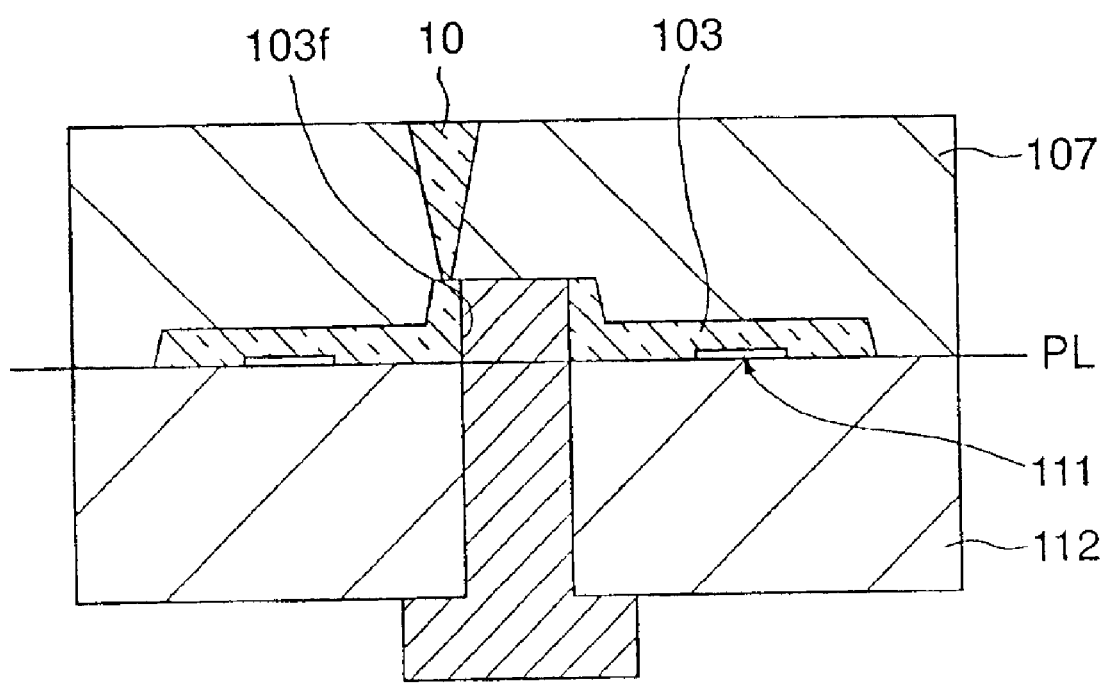
FIG. 43 is a sectional view of still another example of the mold for the scale according to the 14th embodiment.
Figure 44:
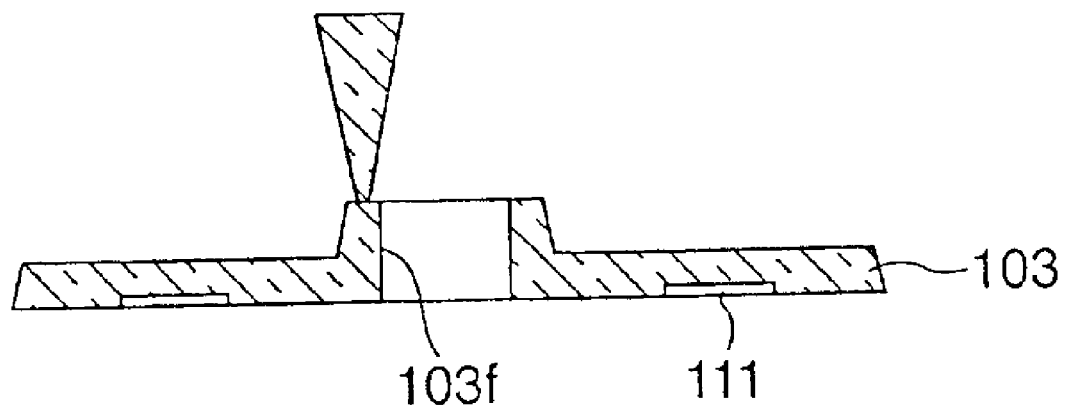
FIG. 44 is a sectional view of still another example of the rotary encoder scale as the product according to the 14th embodiment.

Referring to FIG. 43, unlike in the preceding embodiments, the gate position of a pin disk gate 10 is not set in the center of the disk but is set, for example, at an end portion of a hub portion. This makes it possible to omit the secondary process of forming a through hole for the shaft in the preceding embodiments. As a molded product, a structure having a through hole 103f serving as a shaft holding portion is obtained, as shown in FIG. 44. In this case as well, as in the preceding embodiments, since the shaft fitting portion 103f and the reflecting portion 111 are formed by the same mold portion, the relationship between the reflecting portion pattern center as a single part and the shaft fitting hole can be maintained with high precision.

Figure 45:
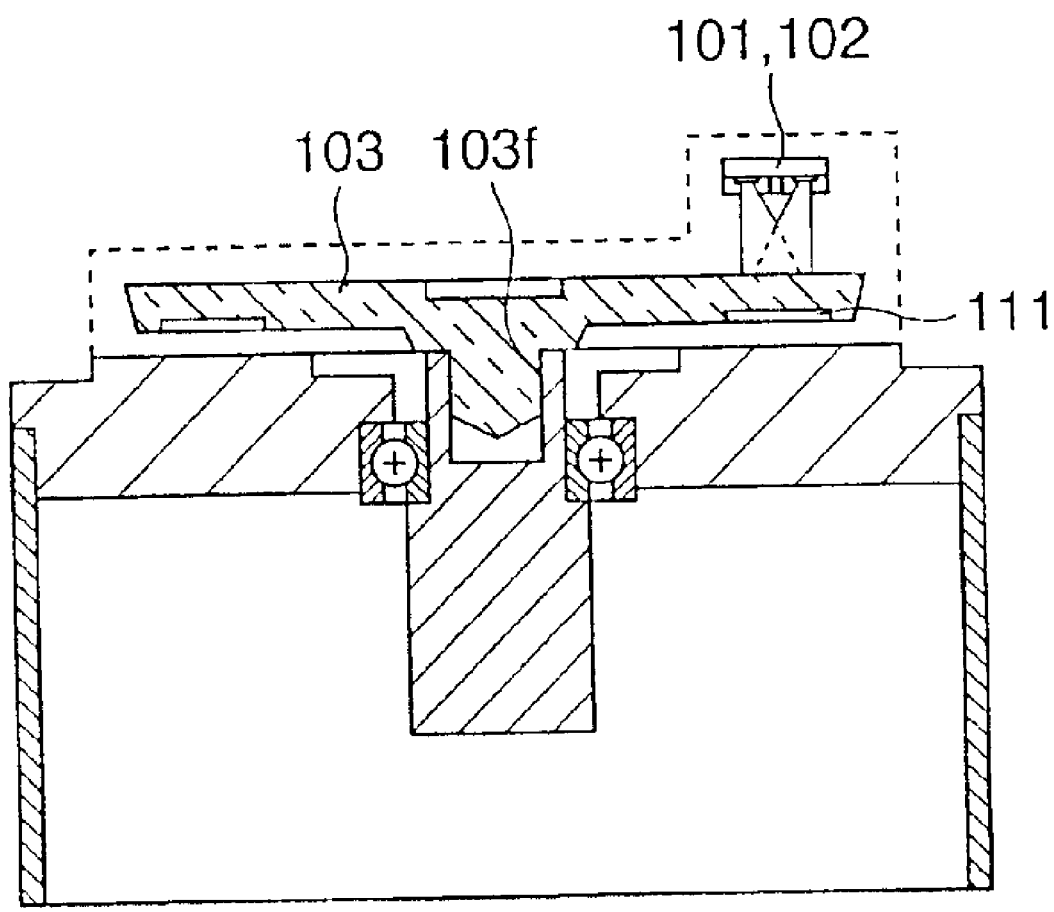
FIG. 45 is a schematic view showing the arrangement of still another example of the rotary encoder according to the 14th embodiment.

FIG. 45 shows an arrangement in which a coupling portion for a rotational angle detection shaft, which has a convex shape, and the shaft side having a concave shape are coupled to each other unlike in the preceding embodiments. The gate position (not shown) of a pin disk gate is set in the center of the disk on the upper side of FIG. 45.

In this case as well, as in the preceding embodiments, the shaft fitting portion 103f and reflecting portion 111 are formed by the same mold portion, the relationship between the reflecting portion pattern center as a single part and the shaft fitting hole can be maintained with high precision.

In addition, since the heads and scale are housed in a minimum space, the profile of the structure can be effectively reduced.

Figure 46:
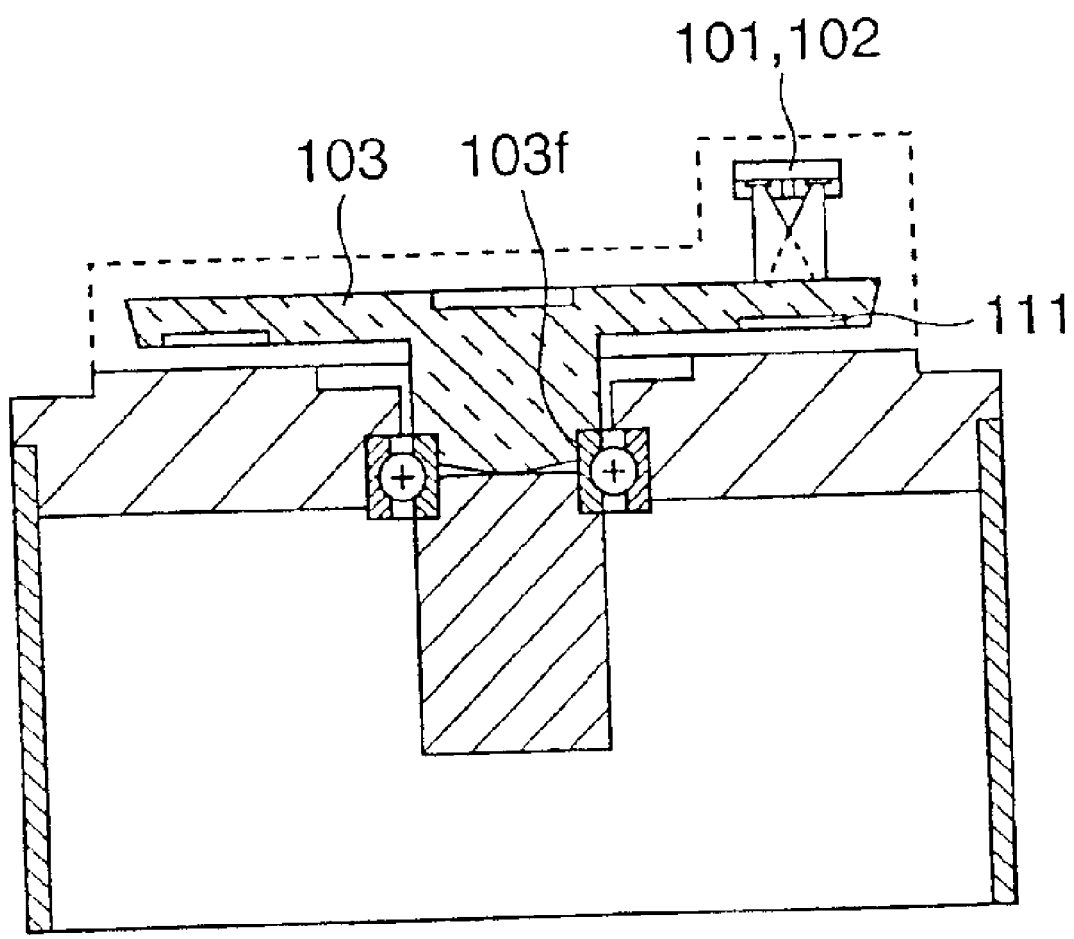
FIG. 46 is a schematic view showing the arrangement of still another example of the rotary encoder according to the 14th embodiment.

FIG. 46 shows an arrangement similar to the above arrangement, in which the convex portion of the shaft coupling portion of the scale is not coupled to the rotating shaft but is coupled to the inner ring of the bearing.

In this case, the same effect as that of the structure shown in FIG. 45 can be obtained.

As described above, according to the 14th embodiment, by properly arranging reflecting elements on a reflector as a measurement/observation target, a high optical transmission efficiency can be obtained without using any lenses for photosensors, and the sensitivity to a relative positional offset between the reflector and the photosensor decreases, thereby realizing a reflector capable of accurately detecting the presence/absence of the reflector or its moving state, and an optical device using the reflector.

Furthermore, by using a reflector as a marker member for an optical sensor or an optical scale, high optical transmission efficiency can be obtained both in light-emitting operation and light-receiving operation. In addition, since the sensitivity to a relative positional offset between the reflector and sensor can be reduced, and no lens is required, a compact, low-profile sensor can be realized. Moreover, since the above optical scale can be manufactured by injection molding and pressing techniques without forming any reflecting film and the like, a process cost can be saved, and a reduction in cost can be attained.

As has been described above, according to the first to 14th embodiments, there is provided an optical scale which can be easily manufactured and can output high-precision position signals.

The present invention is not limited to the above embodiments and various changes and modifications can be made within the spirit and scope of the present invention. Therefore, to apprise the public of the scope of the present invention, the following claims are made.

What is claimed is:

1. An optical scale molded by using movable and fixed platens comprising:
    a reflecting portion for reflecting light emitted from a light-emitting means and for leading the reflected light to a light-receiving means by using a total reflection; and
    a shaft holding portion for holding a shaft and rotating said optical scale with the shaft,
    wherein said reflection portion is disposed only on the same side surface with said shaft holding portion, and
    wherein said reflecting portion and said shaft holding portion, which does not have a through-hole, are integrally formed in one piece using one of the movable platen and the fixed platen, one of the platens having an injection gate at a position corresponding to a center of the scale, by employing one kind of transparent resin material.

2. A scale according to claim 1, wherein said shaft holding portion has a closed-end concave portion fitted on the shaft for rotating said optical scale, and a gate for injecting the resin material during molding is disposed in the closed-end concave portion.

3. A scale according to claim 1, wherein said shaft holding portion has a convex portion to be fitted to the shaft for rotating said optical scale, and a gate for injecting the resin material during molding is disposed at the convex portion.

4. A scale according to claim 1, wherein said shaft holding portion is coupled to a bearing inner ring portion for rotatably holding said optical scale.

5. An optical encoder using said optical scale defined in claim 1, comprising:
    a bearing for rotatably supporting said optical scale; and
    a holding member for holding said bearing and said sensor.

* * * * *

UNITED STATES PATENT AND TRADEMARK OFFICE
CERTIFICATE OF CORRECTION

PATENT NO. : 6,891,150 B2
DATED : May 10, 2005
INVENTOR(S) : Manabu Takayama et al.

It is certified that error appears in the above-identified patent and that said Letters Patent is hereby corrected as shown below:

Column 2,
Line 8, "scale" should read -- scale, --.

Column 3,
Line 35, "are a" should read -- are --.

Column 6,
Line 34, "has" should read -- having --.

Column 7,
Line 40, "amount A" should read -- amount $\Delta$ --.

Column 9,
Line 39, "is possible" should read -- it possible --.

Signed and Sealed this

Twenty-first Day of March, 2006

JON W. DUDAS
*Director of the United States Patent and Trademark Office*